(12) United States Patent
Park

(10) Patent No.: US 10,586,460 B2
(45) Date of Patent: Mar. 10, 2020

(54) METHOD FOR OPERATING UNMANNED DELIVERY DEVICE AND SYSTEM FOR THE SAME

(71) Applicant: Electronics and Telecommunications Research Institute, Daejeon (KR)

(72) Inventor: Moon Sung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 150 days.

(21) Appl. No.: 15/938,963

(22) Filed: Mar. 28, 2018

(65) Prior Publication Data

US 2018/0286252 A1 Oct. 4, 2018

(30) Foreign Application Priority Data

Mar. 30, 2017 (KR) .......................... 10-2017-0040866

(51) Int. Cl.
*G08G 5/00* (2006.01)
*G05D 1/00* (2006.01)
(Continued)

(52) U.S. Cl.
CPC ........... *G08G 5/003* (2013.01); *B64C 39/024* (2013.01); *G05D 1/0011* (2013.01); *G05D 1/101* (2013.01);
(Continued)

(58) Field of Classification Search
CPC .... G08G 5/003; G08G 5/0013; G08G 5/0034; G08G 5/0043; G08G 5/0069; B64C 39/024; B05D 1/101; G06Q 10/0832
(Continued)

(56) References Cited

U.S. PATENT DOCUMENTS 6,421,603 B1 * 7/2002 Pratt ...................... G01C 21/00
244/175
8,082,102 B2 * 12/2011 Ravenscroft ......... G01C 21/005
701/301
(Continued)

FOREIGN PATENT DOCUMENTS

KR 100961875 B1 6/2010
KR 101155708 B1 6/2012
(Continued)

OTHER PUBLICATIONS

Dong-Il You et al., "Design a Path Following Line-of-Sight Guidance Law based on Vehicle Kinematics", Journal of the Korean Society for Aeronautical & Space Sciences, vol. 40, Issue 6, 2012, pp. 506-514, The Korean Society for Aeronautical & Space Sciences.

(Continued)

*Primary Examiner* — Albert K Wong
(74) *Attorney, Agent, or Firm* — William Park & Associates Ltd.

(57) ABSTRACT

Disclosed are a method and system for operating an unmanned delivery device. One embodiment of the method includes setting at least one sampling section with respect to a travel path to a destination of at least one delivery item, determining a type of the sampling section based on location information and altitude information of the sampling section, setting a traveling range including the at least one sampling section based on the type of the sampling section, generating route information including the at least one traveling range, and providing the route information to the unmanned delivery device.

20 Claims, 18 Drawing Sheets

(51) Int. Cl.
*G05D 1/10* (2006.01)
*B64C 39/02* (2006.01)
*G06Q 10/08* (2012.01)

(52) U.S. Cl.
CPC ....... *G06Q 10/0832* (2013.01); *G08G 5/0013* (2013.01); *G08G 5/0034* (2013.01); *G08G 5/0043* (2013.01); *G08G 5/0069* (2013.01); *B64C 2201/066* (2013.01); *B64C 2201/128* (2013.01); *B64C 2201/146* (2013.01)

(58) Field of Classification Search
USPC ............................................................. 701/2
See application file for complete search history.

(56) References Cited

U.S. PATENT DOCUMENTS

| | | | | |
|---|---|---|---|---|
| 9,361,804 | B2* | 6/2016 | Mere | G08G 5/003 |
| 9,613,536 | B1* | 4/2017 | Wolford | G08G 5/003 |
| 10,386,833 | B2* | 8/2019 | Yang | G01P 5/06 |
| 2003/0093219 | A1* | 5/2003 | Schultz | G05D 1/0005 701/533 |
| 2010/0131121 | A1* | 5/2010 | Gerlock | G08G 5/0013 701/2 |
| 2012/0158237 | A1 | 6/2012 | Lee et al. | |
| 2015/0142211 | A1* | 5/2015 | Shehata | H04N 7/181 701/2 |
| 2015/0212206 | A1 | 7/2015 | Lee et al. | |
| 2015/0336668 | A1* | 11/2015 | Pasko | B64C 39/024 701/2 |
| 2015/0339933 | A1* | 11/2015 | Batla | G08G 5/0069 701/120 |
| 2016/0046373 | A1* | 2/2016 | Kugelmass | G05D 1/101 701/8 |
| 2016/0085238 | A1 | 3/2016 | Hayes | |
| 2016/0253908 | A1* | 9/2016 | Chambers | G08G 5/0034 701/2 |
| 2019/0147747 | A1* | 5/2019 | Arngren | G08G 5/0069 701/2 |

FOREIGN PATENT DOCUMENTS

| | | |
|---|---|---|
| KR | 1020160020454 A | 2/2016 |
| KR | 1020160074895 A | 6/2016 |
| KR | 1020160074896 A | 6/2016 |

OTHER PUBLICATIONS

H.S. Cho et al., "Optimal Flight Path Using 2D Data Model", Apr. 1996, pp. 881-884, Korea Information Science Society.

* cited by examiner

METHOD FOR OPERATING UNMANNED DELIVERY DEVICE AND SYSTEM FOR THE SAME

CROSS REFERENCE TO RELATED APPLICATION

The present application claims priority to Korean Patent Application No. 10-2017-0040866, filed Mar. 30, 2017, the entire contents of which is incorporated herein for all purposes by this reference.

BACKGROUND OF THE INVENTION

Field of the Invention

The present disclosure relates generally to a method and apparatus for delivering a package. More particularly, the present disclosure relates to a method and system for operating an unmanned aerial vehicle (UAV) (hereinafter, referred to as an unmanned delivery device) to deliver a package.

Description of the Related Art

Generally, the term 'drone' refers to an unmanned aerial vehicle (UAV), meaning an aircraft without a human pilot aboard. Drones are supported by aerodynamic forces and fly autonomously or under remote control by a human operator. Drones are known as disposable or reusable powered vehicles that can carry weapons or general cargo.

Due to technological advances, drones were being developed in a wide variety of ways. Drones are first developed for military use, but recently various drones for civilian use are being used. Typically, drones have been used for hobby purposes in which they are controlled by a remote controller and are required to fly within a visual range of a user. However, attempts have been made to use drones to deliver a wide variety of cargo, such as documents, books, emergency supplies, and goods, which are not large enough to affect the takeoff weight of drones.

However, there are difficulties in commercialization of drones for delivery purposes because of a short flight duration and distance due to the limited on-board energy source (battery), the limited weight capacity for carrying cargo, and the like.

In particular, flying of drones may be obstructed or restricted due to physical obstacles such as a mountainous or rough terrain or high objects existing on the travel route of drones or due to legal obstacles such as regulations related to restrictions on flight areas of drones. Therefore, it is necessary to control the flight path of a drone to avoid these obstacles.

SUMMARY OF THE INVENTION

Accordingly, the present invention has been made keeping in mind the above problems occurring in the related art, and an objective of the present invention is to provide a method and system for setting a travel route (flight plan) of a drone, which leads to efficient and safe operation of a drone.

Another objective of the present disclosure is to provide a method and system for achieving fast delivery of a package with less battery consumption.

A further objective of the present disclosure is to provide a method and apparatus that can operate an unmanned aerial vehicle within a safe operation zone while minimizing redirection thereof that necessarily occurs due to altitude changes on its travel route in order to minimize battery consumption.

A yet further objective of the present disclosure is to provide a method and system capable of stably operating an unmanned aerial vehicle even in various unexpected situations (route deviation, altitude deviation, etc.) which are likely to occur during delivery of a package to a delivery destination.

The technical problems to be solved by the present disclosure are not limited to the technical matters mentioned above, and other technical problems which are not mentioned but can be solved by the present disclosure are to be clearly understood by those skilled in the art from the following description.

In order to accomplish the above objectives, according to one aspect of the present disclosure, there is provided a method for operating an unmanned delivery device. The method includes: setting at least one sampling section with respect to a travel path to a delivery destination of at least one delivery item; determining a type of the sampling section based on location information and altitude information of the sampling section; setting a traveling range including the at least one sampling section based on the type of the sampling section; generating route information including the at least one traveling range; and providing the route information to the unmanned delivery device.

According to another aspect of the present disclosure, there is provided a system for operating an unmanned delivery device. The system includes: an unmanned delivery device for delivering at least one delivery item to a destination thereof according to route information; an unmanned delivery management device for performing setting a sampling section with respect to a travel path to the destination of the least one delivery item, determining a type of the sampling section based on location information and altitude information of the sampling section, setting a traveling range including the at least one sampling section based on the type of the sampling section, generating the route information including the at least one traveling range, providing delivery list information and the route information to the unmanned delivery device, and checking flight status of the unmanned delivery device; and a delivery management terminal device for outputting the delivery list information, the route information, and the flight status information.

According to another aspect of the present disclosure, there is provided an apparatus for operating an unmanned delivery device. The apparatus includes: at least one processor, the processor being configured to: set at least one sampling section with respect to a travel route to the destination of an at least one delivery item, check a type of the sampling section based on location information and altitude information of the sampling section, set a traveling range including the at least one sampling section based on the type of the sampling section, generate the route information including the at least one traveling range, providing delivery list information and the route information to the unmanned delivery device, and check flight status information of the unmanned delivery device.

The features briefly summarized above are only exemplary aspects of the present disclosure which will be described in detail below, and are not intended to limit the scope of the present disclosure.

As described above, according to the present disclosure, there can be provided a method and system for setting a travel route for efficient and safe flight of a drone.

According to the present disclosure, there can be provided a method and system capable of quickly delivering a delivery item to a delivery destination while minimizing power consumption when delivering the delivery item using a drone.

Further, according to the present disclosure, there can be provided a method and system capable of enabling flight of a drone at a low altitude by reflecting altitude changes on a travel route thereof while avoiding obstacles or hazardous conditions.

According to the present disclosure, there can be provided a method and a system capable of reducing power consumption by minimizing changes in a traveling angle of a drone by setting route information reflecting the altitude of the terrain of a traveling area or the altitudes of obstacles existing on the way to a destination of a delivery item.

According to the present disclosure, there can be provided a method and system for safely delivering a delivery item by taking into account the altitude of the terrain of left-hand and right-hand areas of a drone during flight, and a maximum allowable altitude and a minimum allowable altitude for safe flight of the drone.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
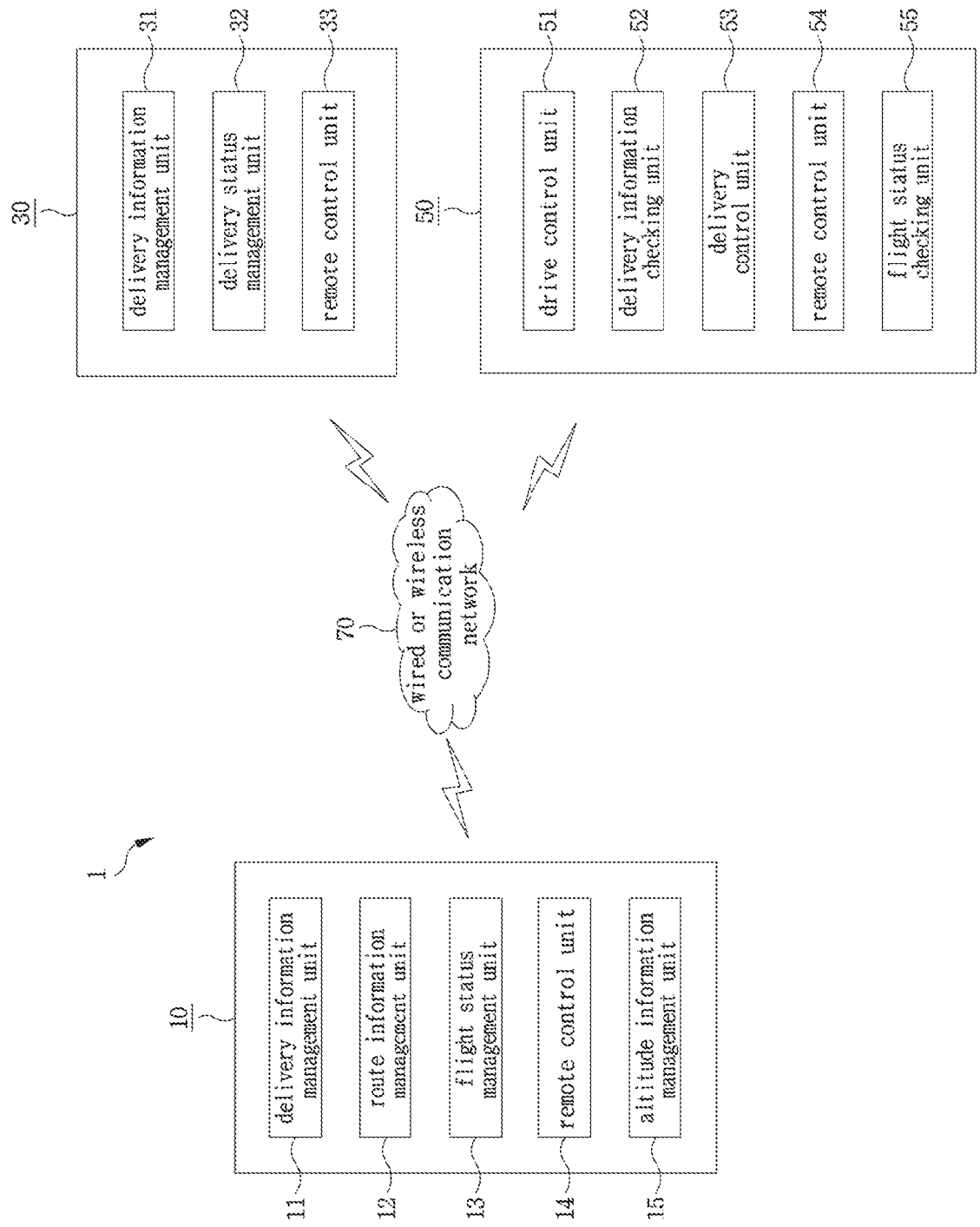
FIG. 1 is a diagram illustrating a system for operating an unmanned delivery device, to which a method of operating an unmanned delivery device according to one embodiment of the present disclosure is applied.

Hereinbelow, embodiments of the present disclosure will be described in detail with reference to the accompanying drawings for those skilled in the art to be able to easily implement the present disclosure. However, the present disclosure may be modified in various different ways and is not limited to the embodiments described herein.

In describing embodiments of the present disclosure, well-known functions or constructions will not be described in detail when it is determined that they may obscure the spirit of the present disclosure. Further, parts not related to description of the present disclosure are not shown in the drawings and like reference numerals are given to like components.

In the present disclosure, it will be understood that when an element is referred to as being "coupled to", "connected", or "combined with" another element, it can be directly coupled or connected to or combined with the other element or intervening elements may be present therebetween. It will be further understood that the terms "comprise", "include", "have", etc. when used in the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms first, second, etc. may be used herein to describe various elements, these elements should not be limited by these terms. These terms are only used to distinguish one element, from another element and not used to show order or priority among elements. For instance, a first element discussed below could be termed a second element without departing from the teachings of the present invention. Similarly, the second element could also be termed the first element.

In the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the present disclosure.

In the present disclosure, all of the constituent elements described in various embodiments should not be construed as being essential elements but some of the constituent elements may be optional elements. Accordingly, embodiments configured by respective subsets of constituent elements in a certain embodiment also may fall within the scope of the present disclosure. In addition, embodiments configured by adding one or more elements to various elements also may fall within the scope of the present disclosure.

Embodiments of the present disclosure will now be described with reference to the accompanying drawings.

FIG. 1 is a diagram illustrating a system for operating an unmanned delivery device, to which an unmanned delivery device operation method according to one embodiment of the present disclosure is applied.

An unmanned delivery device operation system 1 may include an unmanned delivery management device 10, a delivery management terminal device 30, and an unmanned delivery device 50. The unmanned delivery management device 10, the delivery management terminal device 30, and the unmanned delivery device 50 may be connected with each other via a wired or wireless communication network 70.

The unmanned delivery management device 10 checks delivery information related to a delivery item (a package) to be delivered by the unmanned delivery device 50, generates a travel route via which the unmanned delivery device 50 travels to deliver the delivery item, and controls operation of the unmanned delivery device 50. In particular, the unmanned delivery management device 10 may set a safe and optimal travel route via which the unmanned delivery device 50 can safely travel with minimized power consumption, while considering the altitude of a terrain of an area below the travel route of the unmanned delivery device 50, the heights of buildings or objects existing in the area, altitudes of a flight restriction zone, etc.

The delivery management terminal device 30 may check the delivery information provided by the unmanned delivery management device 10, receives location information of the unmanned delivery device 50 from the unmanned delivery management device 10 or the unmanned delivery device 50, and provides the location information of the unmanned delivery device 50 to a user. The delivery management terminal device 30 also may receive and display flight status information indicating the flight status of the unmanned delivery device 50, or control the movement or operation of the unmanned delivery device 50.

The unmanned delivery device 50 may receive route information from the unmanned delivery management device 10 and control its movement to travel according to the route information. The unmanned delivery device 50 may check and transmit location information and altitude information thereof to the unmanned delivery management device 10.

Hereinafter, the configurations and operations of the unmanned delivery management device 10, the delivery management terminal device 30, and the unmanned delivery device 50 will be described in detail.

The unmanned delivery management device 10 may include a delivery information management unit 11, a travel route information management unit 12, a flight status management unit 13, a remote control management unit 14, and an altitude information management unit 15.

The delivery information management unit 11 may store and manage delivery item information including the size and weight of a delivery item. The delivery item information may include information such as a type, price, and detailed name of a delivery item, a recipient to whom the delivery item is to be delivered, and contact information of the recipient. In addition, the unmanned delivery management device 10 may store and manage delivery destination information including a location (address) to which the delivery item is to be delivered.

The delivery destination information may include an address of a delivery destination to which a delivery item is to be delivered, and information (latitude and longitude coordinates) indicating the location of the delivery destination and a return point to which the delivery item is to be returned. The delivery destination information is used as reference information for creating a flight plan.

The delivery item information and the delivery destination information may be input via an input device connected to the unmanned delivery management device 10, and the unmanned delivery management device 10 may generate delivery list information including names of delivery items and addresses of delivery destinations of the delivery items.

As described above, the delivery information management unit 11 may generate, for example, the delivery item information, the delivery destination information, or the delivery list information. However, alternatively, the delivery item information, the delivery destination information, and the delivery list information can be generated by or entered through the delivery management terminal device 30.

The travel route information management unit 12 sets route information indicating a travel route via which the delivery item is moved, based on the delivery item information and the delivery destination information included in the delivery list information. The travel route information management unit 12 may provide the route information to the unmanned delivery device 50. The route information may include a delivery item list including at least one delivery item, order in which the at least one or more delivery items are delivered, a distance to the delivery destination of the at least one delivery item, an estimated delivery time of the at least one delivery item.

In particular, the travel route information management unit 12 may generate the route information reflecting terrain information of an area on the way to the delivery destination of the at least one delivery item when setting the route information. The travel route information management unit 12 may check the altitude information indicating the altitude of the terrain and the altitudes of the buildings existing on the way to the delivery destination. The altitude information may be obtained from the altitude information management unit 15.

The travel route information management unit 12 may check the minimum operating altitude, the maximum operating altitude, the elevation angle or the depression angle, and the like, using the altitude information, and may set various routes using the confirmed information. A method of generating route information based on the altitude information, which is to be performed by the unmanned delivery management device 10, will be described in detail below.

Further, the travel route information management unit 12 may search for a safe landing point in proximity of the unmanned delivery device 50, based on the information (for example, a remaining amount of a battery (remaining runtime), location information, altitude information, etc.) provided by the flight status management unit 13 of the unmanned delivery device 50, and generate a safe travel path from the current location of the unmanned delivery device 50 to the safe landing point. In this case, the travel route information management unit 12 may provide the safe travel path to the unmanned delivery device 50 as safe landing information.

Alternatively, for example, the travel route information management unit 12 may generate safe landing information including an identifier of a safe landing point, and location information indicating the location of the safe landing point an area where the unmanned delivery device 50 can land safely. The unmanned delivery device 50 identifies a safe landing point close to the unmanned delivery device 50 by considering the flight status thereof, for example, the remaining amount of the battery, and generates information of a safe travel path to the safe landing point from the current position thereof. After reaching the safe landing point, the flight status management unit 13 may transmit to the unmanned delivery management device 10 the flight status information including information indicating that the unmanned delivery device has moved to the safe landing point.

The flight status management unit 13 may receive and manage information indicating the flight status (for example, abnormal battery power, remaining amount of battery, normal flight, failure, moving to safe landing point, occurrence of strong wind, landing on the safe landing point, etc.) of the unmanned delivery device 50.

The remote control management unit 14 may receive a signal (or a message) requesting remote control of the unmanned delivery device 50 and may transmit a control permission signal (or message) to the unmanned delivery device 50. Through this operation, the unmanned delivery management device 10 and the unmanned delivery device 50 can configure an environment capable of performing remote control. Subsequently, the remote control management unit 14 may receive and display information (for example, an image of the surrounding area of the unmanned delivery device 50) necessary for remote control of the unmanned delivery device 50, and transmit the remote control signal corresponding to the input of the user to the unmanned delivery device 50.

Although the embodiment of the present disclosure provides an example in which the remote control of the unmanned delivery device 50 is performed by the unmanned delivery management device 10, the present disclosure is not limited thereto. Alternatively, the remote control of the unmanned delivery device 50 can be performed based on the input (instructions) of the delivery management terminal device 30.

In this case, the remote control management unit 14 may receive a signal (or message) requesting remote control of the unmanned delivery device 50, and then transfer the signal (or message) requesting the remote control of the unmanned delivery device 50 to the delivery management terminal device 30. In response to this signal, the delivery management terminal device 30 may transmit a control permission signal (or message) to the remote control management unit 14 or the unmanned delivery device 50. Through this operation, the unmanned delivery management device 10 and the delivery management terminal device 30 may configure an environment capable of performing a remote control (for example, opening a remote control session). Accordingly, the delivery management terminal device 30 may receive and display information (for example, an image of the surrounding area of the unmanned delivery device 50) necessary for remote control of the unmanned delivery device 50, and transmit a remote control signal corresponding to the input of the user to the unmanned delivery device 50.

The altitude information management unit 15 stores and manages altitude information on the terrain. For example, the altitude information management unit 15 may store the highest altitude of the terrain (natural features, such as ridges) and buildings in each predetermined area. In addition, the altitude information management unit 15 may further include information related to a flight restriction or prohibition zone where the flight is restricted or prohibited or flight restriction altitudes at which the flight is restricted or prohibited.

Although the altitude information management unit 15 is provided in the unmanned delivery management device 10 in the present embodiment, the altitude information management unit 15 may be provided as a separate server connected to the unmanned delivery management device 10.

Meanwhile, the delivery management terminal device 30 may be any device having at least one processor, and examples thereof may include a camera, a portable device, a mobile terminal device, a communication terminal device, a portable communication terminal device, and a portable mobile terminal device. For example, the delivery management terminal device 30 may be a smart phone, a car head unit, a laptop computer, a personal digital assistant (PDA), a navigation device, or the like.

The delivery management terminal device 30 may include a delivery information management unit 31, a delivery status management unit 32, and a remote control unit 33.

The delivery information management unit 31 may receive and store the delivery item information, the delivery destination information, or the delivery list information provided by the unmanned delivery management device 10. The delivery information management unit 31 may display the delivery item information, the delivery destination information, or the delivery list information through a graphic user interface (GUI) or the like.

Alternatively, the delivery information management unit 31 may perform functions of the delivery information management unit 11 provided in the unmanned delivery management device 10. In this case, the delivery information management unit 31 may be configured to generate the delivery item information, the delivery destination information, or the delivery list information, and to provide the generated information to the unmanned delivery management device 10.

The delivery status management unit 32 may receive information indicating the flight status (for example, abnormal battery power, normal flight, failure, moving to safe landing point, occurrence of strong wind, and the like) from the unmanned delivery management device 10 or the unmanned delivery device 50, and display the received information through a GUI or the like.

The remote control unit 33 manages the remote control of the unmanned delivery device 50. Specifically, the remote control unit 33 receives a signal (or a message) requesting remote control of the unmanned delivery device 50 from the unmanned delivery management device 10 or the unmanned delivery device 50, and outputs an alarm signal (such as sound or vibration). The user can input an instruction indicating the approval of the remote control. In response to this input, the remote control unit 33 may transmit a control permission signal (or message) allowing the remote control of the unmanned delivery device 50 to the unmanned delivery management device 10 or the unmanned delivery device 50. Through this operation, the remote control unit 33 can configure an environment (for example, opening a remote control session) capable of performing the remote control of the unmanned delivery device 50. Subsequently, the remote control unit 33 may receive and display information necessary for remote control of the unmanned delivery device 50, such as an image of the surrounding area of the unmanned delivery device 50, and transmit a remote control signal corresponding to the input of the user to the unmanned delivery device 50.

Meanwhile, the unmanned delivery device 50 may include a drive control unit 51, a delivery information checking unit 52, a delivery control unit 53, a remote control unit 54, and a flight status checking unit 55.

The drive control unit 51 drives at least one motor to control the movement of the body of the unmanned delivery device such that the unmanned delivery device 50 can move in any direction of the directions including upward, downward, leftward, and rightward.

The delivery information checking unit 52 may receive and store the delivery item information, the delivery destination information, the delivery list information, the route information, and the like, which are provided by the unmanned delivery management device 10. In particular, the delivery information checking unit 52 may provide the route information to the drive control unit 51 so that the unmanned delivery device 50 can move in accordance with the route information.

The delivery information checking unit 52 may provide the delivery item information, the delivery destination information, the delivery list information, and the like to the delivery control unit 53, and confirm that the unmanned delivery device 50 has reached the delivery destination based on the location information included in the delivery destination information. Then, the delivery control unit 53 searches an image for the pattern of a predetermined identifier (for example, an identifier corresponding to the recipient of a delivery item, an identifier indicating the destination of the delivery item, etc.). When the predetermined identifier is located, the delivery control unit 53 calculates and provides information of a distance to the identifier, a distance to a position where the identifier can be recognized, a traveling angle of a travel direction, and information for guiding to a spot where the delivery item can be safely delivered, to the drive control unit 51, and performs a delivery procedure of opening a cargo container and delivering a delivery item to the recipient.

The delivery control unit 53 may generate delivery completion information indicating that at least one delivery item has been delivered to the recipient when the delivery of the at least one delivery item is completed, and transmits the delivery completion information to the unmanned delivery management device 10.

Therefore, the unmanned delivery management device 10 can check the delivery status of the at least one delivery item based on the delivery completion information. In addition, the unmanned delivery management device 10 can monitor whether the unmanned delivery device 50 is safely traveling based on the delivery completion information.

The unmanned delivery management device 10 can check whether the travel time duration of the unmanned delivery device 50 is extended or shortened in comparison with a planned delivery time, based on the delivery completion information. Further, the unmanned delivery management device 10 can calculate information on a turning-back point that enables efficient operation of the unmanned delivery device 50 by reflecting the extending or the shortening of the travel time duration of the unmanned delivery device 50, and updates and provides the calculated information to the unmanned delivery device 50.

Alternatively, the operation of the unmanned delivery management device 10 to check the flight status of the unmanned delivery device 50 based on the delivery completion information may be performed by the flight status management unit 13.

Meanwhile, when the unmanned delivery device 50 reaches the destination of the delivery item but cannot locate the corresponding predetermined identifier (for example, the identifier corresponding to the delivery item's recipient, the identifier indicating the destination of the delivery item, or the like), the delivery control unit 53 may instruct the activation of the remote control unit 54.

The remote control unit 54 may transmit a signal (or message) requesting remote control of the unmanned delivery device 50 to the unmanned delivery management device 10 (or the corresponding delivery management terminal device 30), and then may receive a control permission signal (or message) that allows the remote control of the unmanned delivery device 50, from the unmanned delivery management device 10 or the delivery management terminal device 30.

Through this operation, the remote control unit 54 may configure an environment (for example, opening a remote control session) capable of performing the remote control of the unmanned delivery device 50 in conjunction with the unmanned delivery management device 10 or the delivery management terminal device 30. The remote control unit 54 may transmit information (for example, an image of the surrounding area of the unmanned delivery device 50) required for the remote control of the unmanned delivery device 50, to the unmanned delivery management device 10 or the delivery management terminal device 30 in real time, receive the remote control signal for controlling the operation of the unmanned delivery device 50 from the delivery management terminal device 30, and transfer the remote control signal to the drive control unit 51.

The flight status checking unit 55 may include a position determination module (for example, GPS, GLONASS, etc.) for determining the location information and an altitude sensor for determining the altitude information. The flight status checking unit 55 may provide the location information and the altitude information to the delivery management device 10 according to a predetermined rule (for example, at a periodic interval of a predetermined time unit).

The flight status checking unit 55 may provide the remaining amount of the battery to the delivery management device 10 every predetermined time unit. Alternatively, the flight status checking unit 55 may transmit information indicating a low battery level to the delivery management device 10 when the remaining amount of the battery is less than a predetermined threshold value.

As described above in connection with the safe landing point, when the remaining amount of the battery drops to a predetermined threshold value, the flight status checking unit 55 may transmit a signal requesting approval of movement to the safe landing point, to the unmanned delivery management device 10. In this case, the delivery information checking unit 52 may receive the safe travel path to the safe landing point, provided by the unmanned delivery management device 10, and transfer the safe travel path to the drive control unit 51.

In an alternative way, when the remaining amount of the battery drops to a predetermined threshold value, the flight status checking unit 55 may provide a signal for requesting approval of movement to a safe landing point to the delivery information checking unit 52. In response to this signal, the delivery information checking unit 52 may locate a safe landing point close to the unmanned delivery device 50, generates a safe travel path to the safe landing point, and provides the safe travel path to the drive control unit 51 so that the unmanned delivery device 50 can move to the safe landing point.

Through this operation, the unmanned delivery device 50 can move to the safe landing point. The flight status checking unit 55 may inform the unmanned delivery management device 10 of the fact that the unmanned delivery device 50 has safely landed on the safe landing point.

The flight status checking unit 55 may check the location information and the altitude information thereof and check whether the confirmed location information and the altitude information are deviated from a planned traveling range or a planned waypoint included in the route information. The flight status checking unit 55 may request that the remote control unit 54 performs the remote control operation when the confirmed location information and the altitude information are deviated from the planned traveling range or the planned waypoint included in the route information.

The route information may include information of an auxiliary traveling zone that is a predetermined size area extended from the planned traveling range. When the confirmed location information and altitude information are out of the auxiliary traveling zone, the flight status checking unit 55 may request that the remote control unit 54 performs the remote control operation.

Figure 2A:
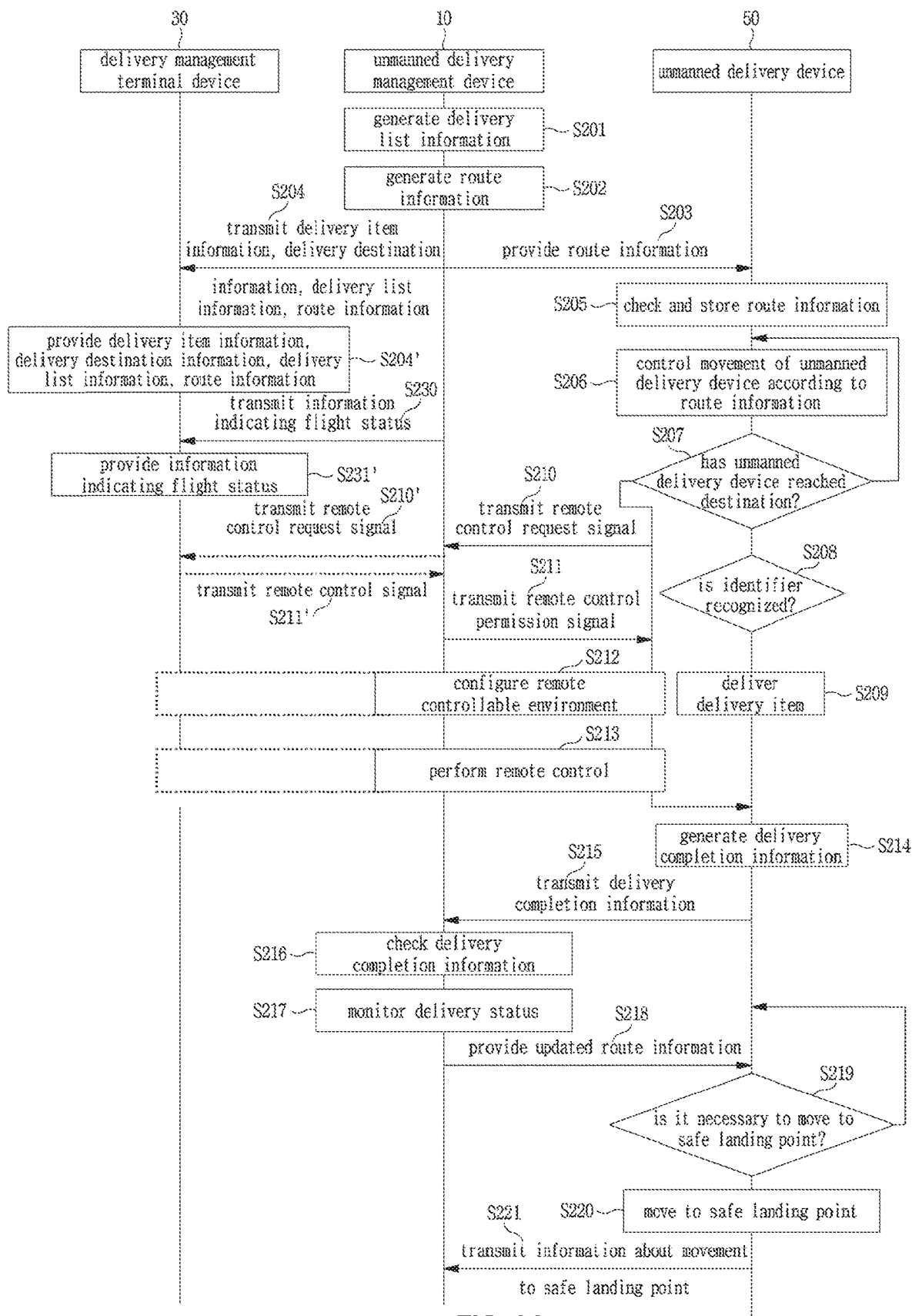
FIG. 2A is a flowchart illustrating the sequential flow of the unmanned delivery device operation method according to one embodiment of the present disclosure.

FIG. 2A is a flowchart illustrating a method of operating an unmanned delivery device, according to one embodiment of the present disclosure.

The unmanned delivery device operation method can be performed by the components provided in the unmanned delivery device operation system described above.

First, the unmanned delivery management device 10 may generate delivery list information including delivery item information and delivery destination information (S201).

The delivery item information may include information such as the type, price, and detailed name of a delivery item, the recipient to whom the delivery item is to be delivered, contact information of the recipient. The delivery destination information may include an address or a location of the delivery destination and an identifier of the delivery destination of the delivery item.

The unmanned delivery management device 10 generates route information for the delivery item, via which the delivery item can be delivered, based on the delivery item information and the delivery destination information included in the delivery list information (S202), and provides the generated route information to the unmanned delivery device 50 (S203).

The route information may include a delivery list including at least one delivery item, an order in which the at least one or more delivery items are delivered, destination identifiers of the at least one delivery item, and delivery routes to the destinations of the at least one or more delivery items.

In particular, the unmanned delivery management device 10 may set waypoints of the unmanned delivery device 50 on the way to the delivery destination by reflecting the information on the terrain of an area existing on the way to the destination when generating an optimal delivery route to the destination of at least one delivery item. The unmanned delivery management device 10 may check the altitude information indicating the altitude of the terrain and the altitudes of the buildings and check a minimum operating altitude, a maximum operating altitude, an elevation angle for upward movement, a depression angle for downward movement, etc. using the confirmed altitude information, and set various waypoints on the delivery route using the confirmed information. The operation of the unmanned delivery management device 10 to generate the route information including the waypoints using the altitude information will be described in detail later when describing in connection with FIG. 2B.

Meanwhile, the unmanned delivery device 50 may receive and store the route information (S205). The unmanned delivery device 50 can perform control its operation by itself such that the unmanned delivery device 50 can autonomously travel to the delivery destination of at least one delivery item according to the route information (S206).

The unmanned delivery device 50 may check whether it has arrived at the delivery destination of at least one delivery item by checking the location information thereof (S207). Next, the unmanned delivery device 50 scans an image of a predetermined identifier (for example, an identifier corresponding to the recipient of the delivery item, an identifier indicating the location of the destination of the delivery item, or the like) to search for the pattern of the identifier (S208). When pattern of the identifier is located, calculation is performed to obtain information including a distance between the unmanned delivery device 50 and the identifier, a distance to a location where the identifier can be recognized, and angles for directing the unmanned delivery device toward the location, and the calculated information is provided to the drive control unit 51. Information for guiding the unmanned delivery device 50 to a spot where the delivery item can be safely delivered to the recipient is provided to the drive control unit 51, so that the unmanned delivery device 50 can perform a delivery procedure of opening a cargo container and delivering the delivery item to the recipient (S209).

On the other hand, when the destination identifier is not located, the unmanned delivery device 50 may make a request for remote control thereof. That is, the unmanned delivery device 50 may transmit a signal (or a message) requesting remote control thereof, to the unmanned delivery management device 10 (S210), and then receive a control permission signal (or message) allowing the remote control of the unmanned delivery device from the unmanned delivery management device 10 (S211).

Through this operation, the unmanned delivery device 50 can configure an environment (for example, opening a remote control session) capable of performing a remote control process thereof in conjunction with the unmanned delivery management device 10 (S212).

By configuring the remote controllable environment (for example, opening a remote control session), the unmanned delivery device 50 can transmit, in real time, information (for example, an image of the surrounding area of the unmanned delivery device 50) necessary for remote control of the unmanned delivery device 50 to the unmanned delivery management device 10 and receive a remote control signal for controlling the operation of the unmanned delivery device 50 from the unmanned delivery management device 10. In this way, movement of the unmanned delivery device 50 and the delivery of the delivery item can be performed (S213).

In the embodiment of the present disclosure, the unmanned delivery management device 10 may perform the remote control of the unmanned delivery device 50 through Steps S210 to S213. However, there is an alternative way. That is, when the delivery management terminal device 30 may perform the remote control of the unmanned delivery device 50. For example, the delivery management terminal device 30 may receive a signal (or a message) requesting remote control of the unmanned delivery device 50 from the unmanned delivery management device 10 or the unmanned delivery device 50 (S210'), and transmit a control permission signal (or message) for allowing the remote control, to the unmanned delivery management device 10 or the unmanned delivery device 50. Thus, an environment (a remote control session) in which the unmanned delivery device 50 can be remote-controlled by the delivery management terminal device 30 is configured, and information necessary for remote control can be transmitted and received between the unmanned delivery device 50 and the delivery management terminal device 30.

When the delivery of the delivery item is completed according to the above-described procedure, the unmanned delivery device 50 may generate delivery completion information indicating that the delivery item has been delivered to the recipient (S214), and transmit the delivery completion information to the unmanned delivery management device 10 (S215).

The unmanned delivery management device 10 may check the delivery status of at least one delivery item based on the delivery completion information (S216).

The delivery completion information may be used as information for monitoring whether the unmanned delivery device 50 is safely traveling. That is, the unmanned delivery management device 10 may check whether the travel time duration of the unmanned delivery device 50 is extended or shortened in comparison with a planned delivery time, based on the delivery completion information (S217).

Further, the unmanned delivery management device 10 may generate route information, by which the unmanned delivery device 50 can be efficiently operated, by reflecting the extending or the shortening of the travel time duration of the unmanned delivery device 50 or a deliverer, and provide the obtained route information to the unmanned delivery device 50 (S218).

The unmanned delivery device 50 may monitor the flight status thereof to determine whether it is necessary to move a safe landing point (S219). When it is necessary, the unmanned delivery device 50 is routed to the safe landing point (S220). Steps S219 and S220 may be performed in parallel with steps S205 to S218 described above.

Whether or not the movement of the unmanned delivery device 50 to the safe landing point is necessary may be determined by reflecting the remaining amount of the battery, the weather condition, and the like. For example, when it is confirmed that the remaining amount of the battery is below a predetermined threshold value or when it is confirmed that the unmanned delivery device (unmanned aerial vehicle) deviates from the planned route due to a wind or the like, the movement of the unmanned delivery device 50 to the safe landing point is determined as being necessary.

In an alternative way, the unmanned delivery management device 10 may determine whether movement of the unmanned delivery device 50 to a safe landing point is required and then provide information of the determination results to the unmanned delivery device 50. For example, the unmanned delivery device 50 may provide the unmanned delivery management device 10 with the remaining amount of the battery or the location information thereof at predetermined time intervals, and the unmanned delivery management device 10 may determine whether the unmanned delivery device 50 is required to move to a safe landing point based on the remaining amount of the battery or the location information, generate a safe travel path to the safe landing point if necessary, and provide the safe travel path to the unmanned delivery device 50 so that the unmanned delivery device 50 can move to the safe landing point.

In a further alternative way, the unmanned delivery device 50 may check the remaining amount of the battery and the location information at predetermined time intervals. When the unmanned delivery device 50 confirms that the remaining amount of the battery is below a predetermined threshold value or that the current location thereof is deviated from a planned travel route due to strong wind or the like, the unmanned delivery device 50 may determine that it is necessary to move to a safe landing point.

Through this operation, the unmanned delivery device 50 can move to the safe landing point. The unmanned delivery device 50 may provide the unmanned delivery management device 10 with information indicating safe landing of the unmanned delivery device 50 (S221).

The delivery management terminal device 30 may receive and store the delivery item information, the delivery destination information, the delivery list information, the route information, and the like provided by the unmanned delivery management device 10 (S204). In addition, the delivery management terminal device 30 may output the delivery item information, the delivery destination information, the delivery list information, and the route information via a GUI or the like (S204').

In addition, the delivery management terminal device 30 may receive flight status information (for example, information indicating abnormal battery power, normal flight, failure, moving to safe landing point, occurrence of strong wind, etc.) from the unmanned delivery management device 10 or the unmanned delivery device 50 (S230), and may display the received information via a GUI or the like (S231).

Figure 2B:
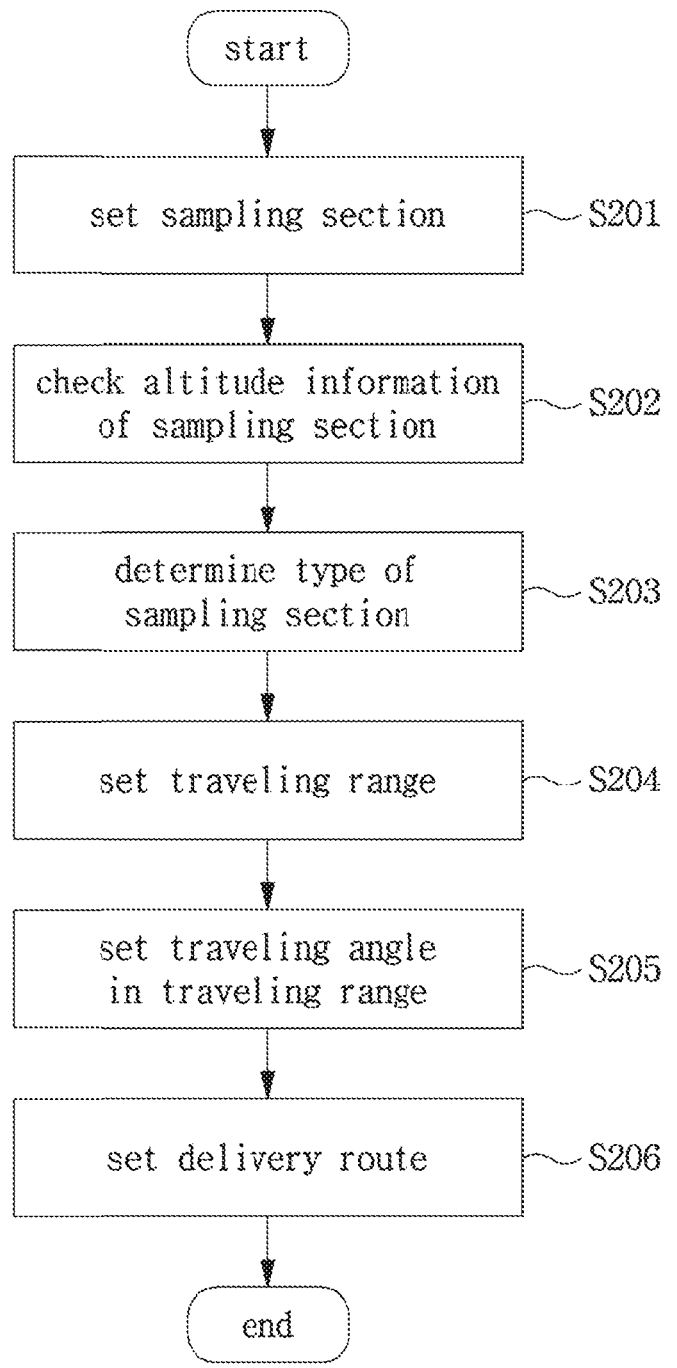
FIG. 2B is a flowchart illustrating the detailed flow of a route information generation process included in the unmanned delivery device operation method according to one embodiment of the present disclosure

FIG. 2B is a flowchart illustrating a detailed procedure of a route information generation process included in the unmanned delivery device operation method according to the embodiment of the present disclosure.

First, the unmanned delivery management device 10 may check the origin of the unmanned delivery device 50 and the destination of at least one delivery item included in the delivery list. For example, the destinations of at least one or more delivery items may include a first destination for a first delivery item, a second destination for a second delivery item, . . . , and an n-th destination for an n-th delivery item (n is a natural number). In consideration of these destinations, the unmanned delivery management device 10 may set a travel route including a first route from the origin to the first destination, a second route from the first destination to the second destination, . . . , and an an-th route from an n-1-th destination to the n-th destination.

Figure 3:
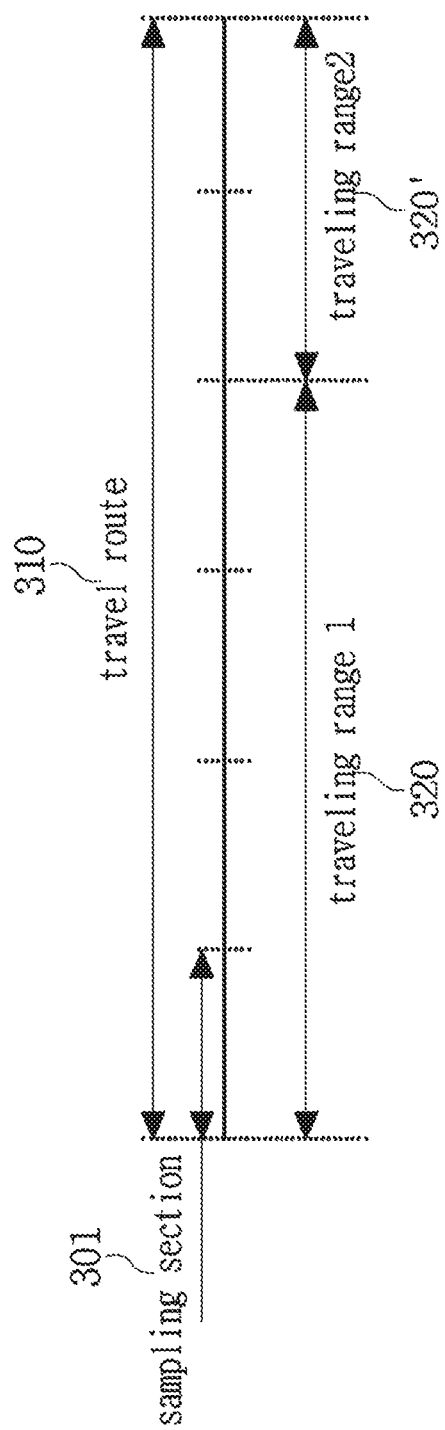
FIG. 3 is a diagram illustrating a travel route, a sampling section, and a traveling range used in the unmanned delivery device operation method according to one embodiment of the present disclosure.

The unmanned delivery management device 10 may set a sampling section 301 to determine a travel route 310 (see FIG. 3) (S251).

The sampling section may be a portion of the entire travel route 310. The sampling sections may be obtained by dividing the entire travel route 310 by a predetermined number or a predetermined distance unit.

The unmanned delivery management device 10 may set the sampling sections 301 considering the total traveling distance, which is a two-dimensional traveling distance measured without considering altitude gradients, and a traveling angle based on the travel direction.

Specifically, latitude and longitude values are input as input values to generate the destination coordinates d and the origin coordinates S based on the Universal Transverse Mercator Coordinate System (UTM).

|  | origin (latitude/ longitudes) | destination (latitude/ longitude) d | calculation of distance \|s-d\| |
|---|---|---|---|
| x-ea (EW Long) | 452671.847 | 454439.056 | 1767.209 |
| y-no (Northing) | 4115582.92 | 4117029.27 | 1446.35 |

For example, the total traveling distance and the angle of the travel direction (hereinafter, referred to as the traveling angle) can be calculated through the following Equations 1 and 2, respectively. In Equations 1 and 2, $x_{ea}$ and $y_{n0}$ are values obtained by converting latitude and longitude values, respectively, in which $x_{ea}(s)$ is a value obtained by converting the latitude value of the origin, $x_{ea}(d)$ is a value obtained by converting the latitude value of the destination, $Y_{n0}(s)$ is a value obtained by converting the longitude value of the origin, and $Y_{n0}(d)$ a value obtained by converting the longitude value of the destination.

$$\text{Total traveling distance} = \sqrt{(x_{ea(d)} - x_{ea(s)})^2 + (Y_{n0(d)} - Y_{n0(s)})^2} \quad [\text{Equation 1}]$$

$$\text{Traveling angle} = \sin\left(\frac{(x_{ea(d)} - x_{ea(s)})}{\sqrt{(x_{ea(d)} - x_{ea(s)})^2 + (Y_{n0(d)} - Y_{n0(s)})^2}}\right) * \left(\frac{180}{n}\right) \quad [\text{Equation 2}]$$

The unmanned delivery management device 10 may set a predetermined distance unit to be a reference value for distinguishing each sampling section 301 and obtain the latitude and longitude values at each point every predetermined distance unit. Then, the unmanned delivery management device 10 may obtain the terrain altitude values at the predetermined points of the sampling sections 301 from a terrain altitude database (S252).

| number of samplings | i, n | 0 | 1 | 2 | 3 | . . . | 76 |
|---|---|---|---|---|---|---|---|
| latitude | lat(i) | 37.18549 | 37.18566 | 37.1858364 | 37.1860092 | | 37.19862 |
| longitude | lon(i) | 128.4668 | 128.467 | 128.4673055 | 128.4675663 | | 128.4866 |
| terrain altitude (m) | a(i) | 208.3146 | 208.6943 | 208.925903 | 208.592453 | | 774.6169 |
| change in height | A(i) | 0.37976 | 0.37976 | 0.231568 | −0.33345 | | −2.685 |

Further, in Step S252, the unmanned delivery management device 10 may reset the sampling sections by reflecting the altitude information of the terrain of an area ranging from the origin to the final destination. For example, the unmanned delivery management device 10 sets a range from the origin to the destination as one sampling section when a maximum value of the terrain altitude values of an area between the origin and the destination is equal to or smaller than a minimum value of maximum operating altitude information.

Figure 5A:
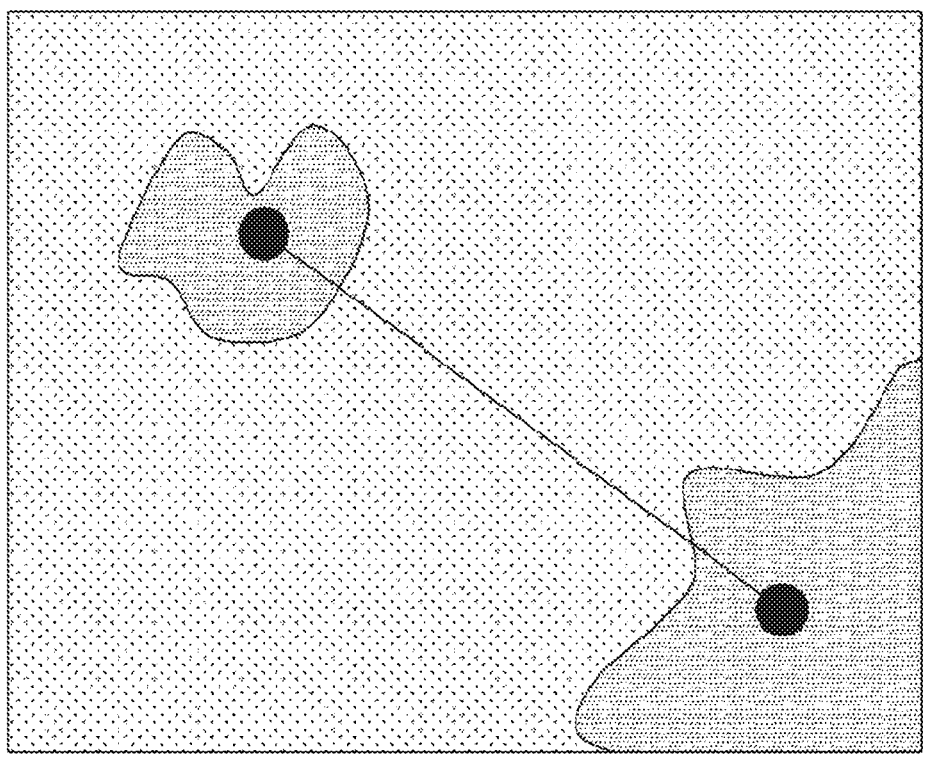
FIG. 5A is a diagram illustrating a travel route used in the unmanned delivery device operation method according to one embodiment of the present disclosure.
Figure 5B:
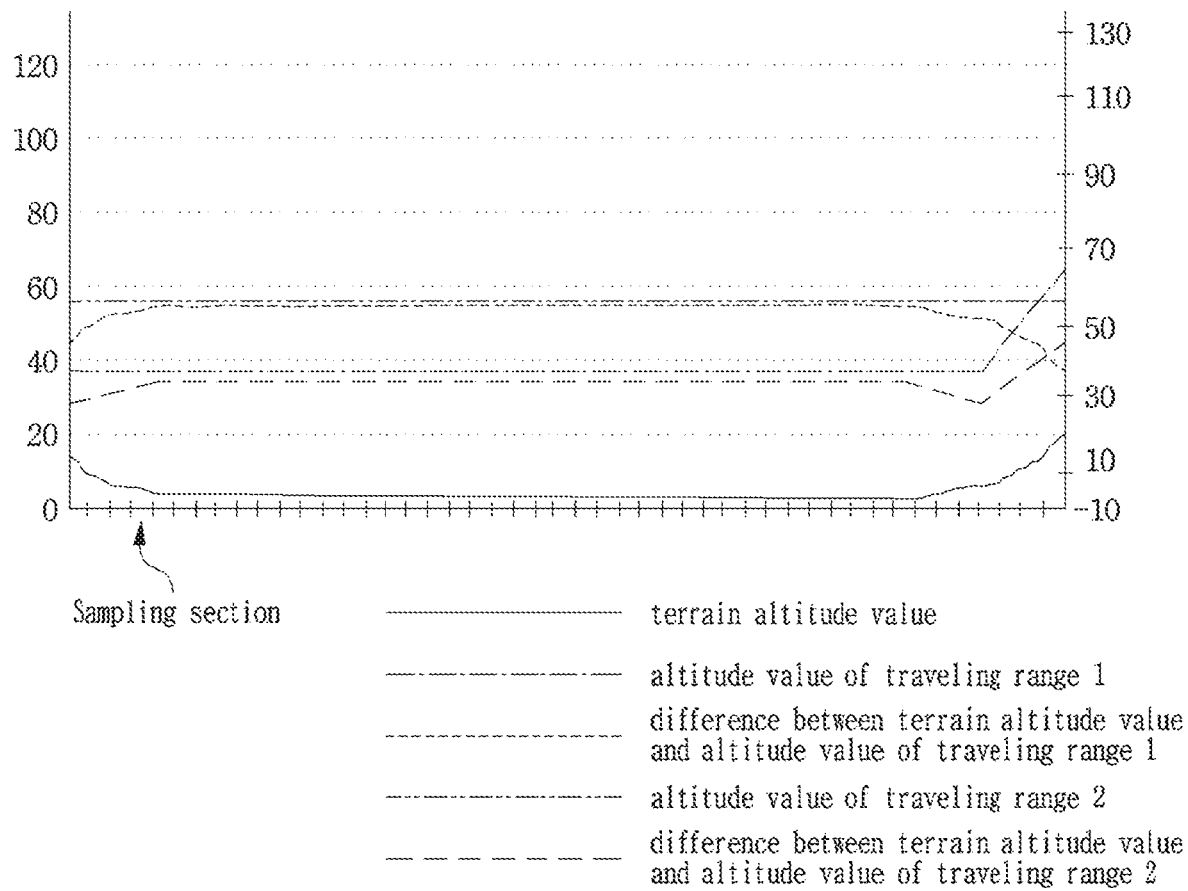
FIG. 5B is a diagram illustrating sampling sections, a traveling range, a travel route, and an altitude of a terrain of FIG. 5A.

The reason why the maximum value of the terrain altitude values is smaller than the minimum value of the maximum operating altitude information is that the terrain of an area between the origin and the destination may be a region where changes in the terrain or the natural feature is relatively small like a sea area as illustrated in FIGS. 5A and 5B. In an embodiment of the present disclosure, the minimum operating altitude information may be set in view of the altitude range of the terrain, the altitude range of the natural features or buildings, an error range of the altitude measurement, etc. The maximum operating altitude may be set in view of a flight restriction or prohibition altitude range according to aviation safety rules, an error range of altitude measurement, etc.

On the other hand, when the maximum value of the terrain altitude values of an area between the origin and the destination does not satisfy the condition in which it is equal to or smaller than the minimum value of the maximum operating altitude information, the unmanned delivery management device 10 may generate a traveling range within which the unmanned delivery device can travel while maintaining a safety altitude (low altitude) according to the type of the sampling section 301.

Specifically, the unmanned delivery management device (a device for managing operation of an unmanned aerial vehicle (UAV)) may check a difference in the altitude value between the sampling sections 301 and check the types of the sampling sections 301 to determine whether the continuous horizontal movement of the unmanned delivery device (i.e., an unmanned aerial vehicle (UAV) is possible, based on the difference in the altitude value between the sampling sections 301 (S253).

The types of the sampling sections 301 may include a horizontally movable sampling section within an upward movement traveling range, a horizontally movable sampling section within a downward movement traveling range, an upwardly movable sampling section, and a downwardly movable sampling section.

A method of determining the types of the sampling sections 301 may be determined by the following Equation 3. As an initial condition for classifying a certain sampling section as a horizontally movable sampling section, an area where a terrain altitude change is within a predetermined threshold value range (e.g., α) may be determined as being a horizontally movable sampling section. The predetermined threshold value range (e.g., α) may be set considering the minimum value of the maximum operating altitude information. For example, the predetermined threshold value range (e.g., α) may be set to about 10 m that is half the minimum value of the maximum operating altitude information.

$$0 \leq A_{(i)} \leq \alpha \rightarrow g_{(i)} = 0, \quad A_{(i)} > \alpha \rightarrow g_{(i)} = 1$$

$$-\alpha \leq A_{(i)} < 0 \rightarrow g_{(i)} = 2, \quad A_{(i)} < -\alpha \rightarrow g_{(i)} = 3 \quad [\text{Equation 3}]$$

Figure 4:
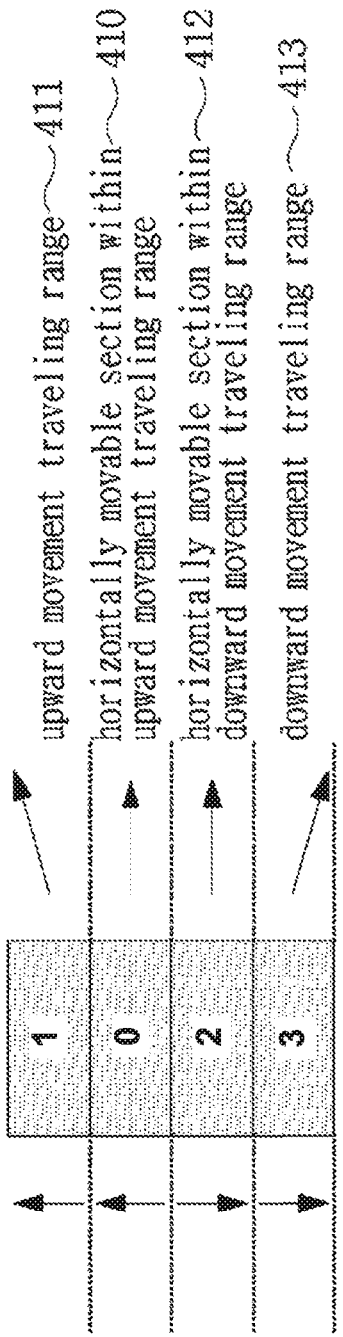
FIG. 4 is a diagram illustrating the types of the sampling sections used in the unmanned delivery device operation method according to one embodiment of the present disclosure.

$A_{(i)}$ represents an altitude value of a traveling range, and $g_{(i)}$ represents a type of a sampling section. Further, $g_{(i)}=0$ indicates a horizontally movable section 410 within an upward movement traveling range, $g_{(i)}=2$ indicates a horizontally movable section within a downward movement traveling range, $g_{(i)}=1$ indicates an upwardly movable section 411, and $g_{(i)}=3$ indicates a downwardly movable section 413 (see FIG. 4).

Next, when the type of the sampling section 301 is determined, the unmanned delivery management device 10 may set a traveling range 320 or 32' based on the cumulative sum of the altitude difference values of each sampling section 301 (S254).

For example, the unmanned delivery management device 10 sets at least one sampling section 301, each having a cumulative sum of altitude difference values smaller than a predetermined threshold value, as a single traveling range. This traveling range is called a horizontal movement traveling range.

Further, the unmanned delivery management device 10 may set the traveling ranges 320 and 320' by reflecting terrain altitude information, safe altitude range information, and the like. Herein, the safe altitude range information may indicate a range from the minimum operating altitude information to the maximum operating altitude information.

The unmanned delivery management device 10 may check the cumulative sum of the terrain altitude difference values for each of the sampling sections 301 having the same type (see Equation 4).

Identification of a range of each travel direction and the number of sections having the same travel direction When $g_{(i)}=g_{(i-1)}, l_{(i)}=g_{(i-1)}$ When $g_{(i)} \ne g_{(i-1)}, l_{(i)}=g_{(i-1)}+1$, where the initial value $g_{(0)}=1$ Generation of a terrain altitude difference value within a traveling range of the same travel direction When $g_{(i)}=g_{(i-1)}, D_{(i)}=D_{(i-1)}+A_{(i)}$, wherein the initial value $D_{(0)}=0$ When $g_{(i)} \ne g_{(i-1)}, D_{(i)}=A_{(i)}$ [Equation 4]

In Equation 4, $l_{(i)}$ represents the number of sampling sections classified as the same type.

The unmanned delivery management device 10 may set the initial value of the cumulative altitude value for the same type of sampling sections 301 to the altitude difference value at the point where the types of the sampling sections are changed, and cumulatively add terrain altitude difference values to the initial altitude value, for the same type of sampling sections. Then, the unmanned delivery management device 10 may compare the cumulative total of the terrain altitude difference values calculated through the above-described operation with a predetermined threshold value (e.g., α), and may set the horizontal movement traveling range based on the comparison result. The unmanned delivery management device 10 may check the number of sampling sections included in the horizontal movement traveling range when the horizontally moveable sampling sections consecutively occur. This value is used to provide the number of horizontally movable sections.

In this process, sampling sections having the type 0 or the type 2 are determined as being sampling sections where horizontal movement is possible (i.e. horizontally movable sampling sections), and sampling sections that are not determined as the horizontally movable sections may be determined as being a downward movement traveling range or an upward movement traveling range.

Identification of a horizontal movement traveling range

When $|D_{(i)}|<\alpha$ and not when $H_{(i)}=1, H_{(i)}=0, h_{(i)}=0$

Calculation of the number of sampling sections within the horizontal movement traveling range (to be provided as additional information of the route information)

When $|D_{(i)}|<\alpha$ and $h_{(i-1)} \ne 0, h_{(i)}=h_{(i)}+1$

When $|D_{(i)}|<\alpha$ and $h_{(i-1)}=0, H_{(i)}=0, h_{(i)}=0$ [Equation 5]

The unmanned delivery management device 10 may determine whether some sampling sections have the same travel direction using the types of the sampling sections, may determine the number of consecutive sampling sections when the sampling sections having the same travel direction consecutively occur.

The unmanned delivery management device 10 may set a series of the sampling sections having the same travel direction as a sing traveling range. Further, the unmanned delivery management device 10 may set a travel slope within a traveling range, i.e. within each upward movement traveling range or each downward movement traveling range.

The unmanned delivery management device 10 may determine whether or not the same travel direction is indicated through Equation 6, and determine the number of consecutive sampling sections having the same travel direction through Equation 7.

When ($A_{(i)}>0$ OR $A_{(i)}=0$), and when ($A_{(i)}=0$ OR $A_{(i)}<\alpha$ OR $A_{(i)}=\alpha$), $\rightarrow g_{(i)}=0$, or $\rightarrow g_{(i)}=1$ When $A_{(i)}<0$ and when ($-\alpha=A_{(i)}$ OR $A_{(i)}>-\alpha$), $\rightarrow g_{(i)}=2$, or $\rightarrow g_{(i)}=3$ [Equation 6]

When $g_{(i)}=g_{(i-1)}, l_{(i)}=g_{(i-1)}$

When $g_{(i)} \ne g_{(i-1)}, l_{(i)}=g_{(i-1)}+1$, wherein the initial value $g_{(0)}=1$ [Equation 7]

Further, the unmanned delivery management device 10 may check whether the horizontal movement is possible for each sampling section included even in the upward movement traveling range or the downward movement traveling range, and determine the number of sampling sections where the horizontal movement is possible within the upward movement traveling range or the downward movement traveling range. The unmanned delivery management device 10 may generate an identification value $Id_{(i)}$ for each traveling range through the operation of Equation 8, generate an identification value for a start point of the traveling range through the operation of Equation 9, generate an identification value for an end point of the traveling range through the operation of Equation 10, and calculate the number of the traveling ranges through the operation of Equation 11.

When $H_{(i)}=H_{(i-1)}$ and when ($|D_{(i)}|<\alpha$) and ($g_{(i)} \ne g_{(i-1)}$), $Id_{(i)}=Id_{(i-1)}+1$, wherein $Id_{(0)}=0$ Else $Id_{(i)}=Id_{(i-1)}$ When $H_{(i)} \ne H_{(i-1)}, Id_{(i)}=Id_{(i-1)}+1$ [Equation 8]

When $Id_{(i)} \ne Id_{(i-1)}, S_{(id)}=i, E_{(id)}=1$ [Equation 9]

When $Id_{(i)}=Id_{(i-1)}, E_{(id)}=E_{(id)}+1$ [Equation 10]

$E_{(id)}=S_{(id)}+E_{(id)}-1$ [Equation 11]

Figure 6A:
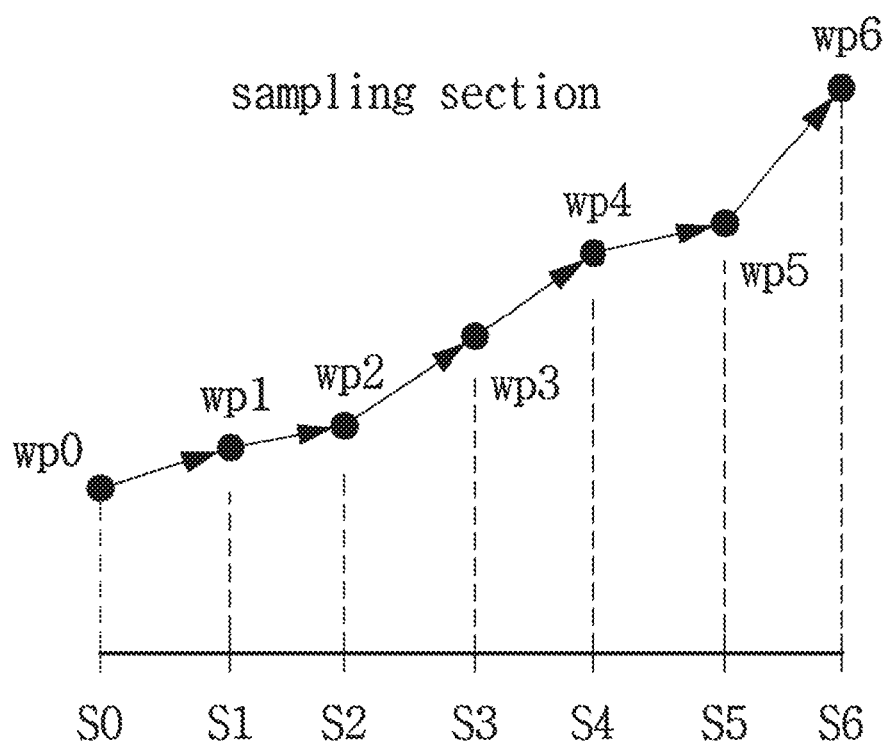
FIGS. 6A and 6B are views illustrating a relationship between a sampling section and a traveling range used in the unmanned delivery device operation method according to one embodiment of the present disclosure.
Figure 6B:
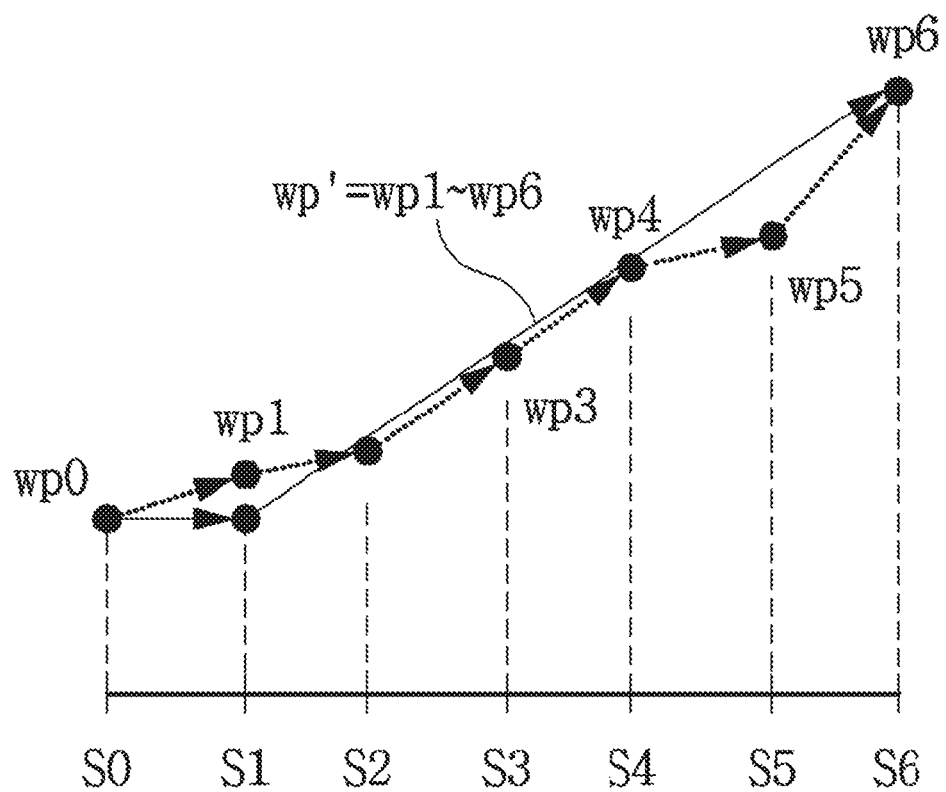
Figure 7A:
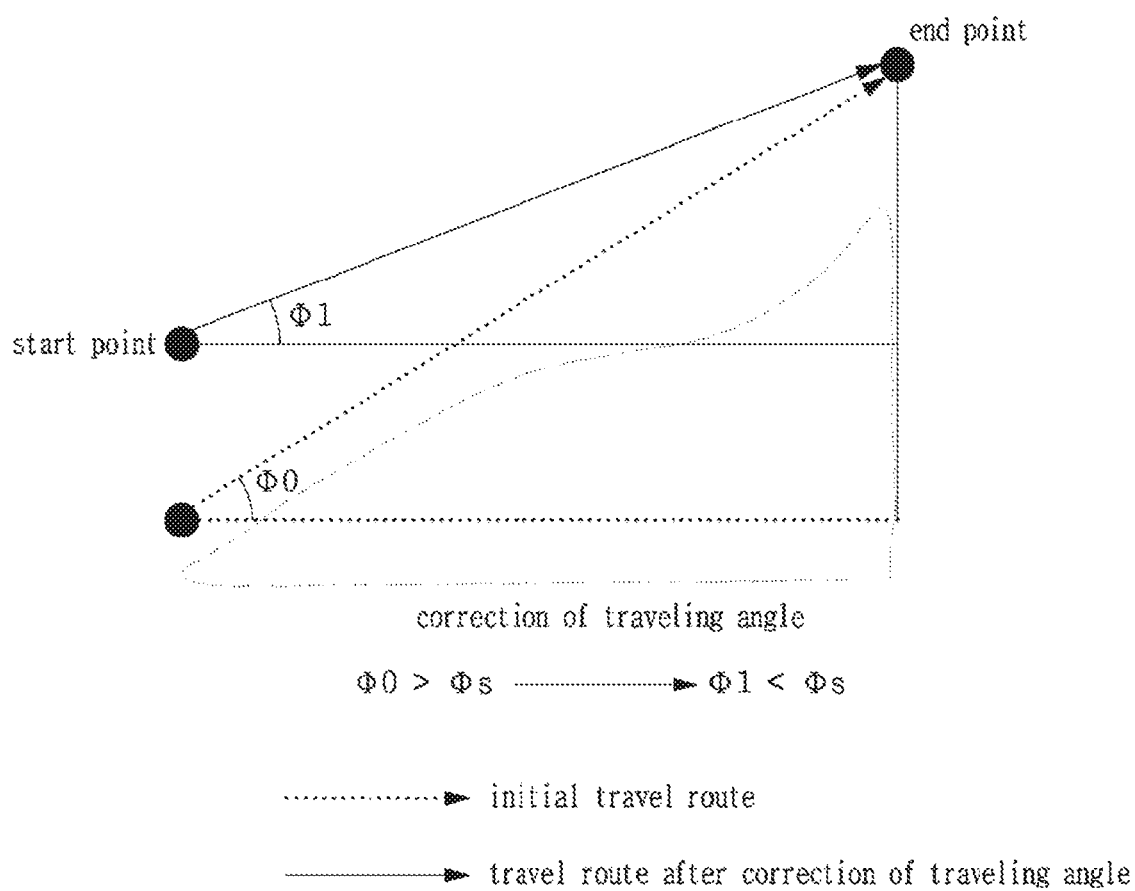
FIGS. 7A to 7D are diagrams illustrating a method of generating a corrected altitude in the unmanned delivery device operation method according to one embodiment of the present disclosure.
Figure 7B:
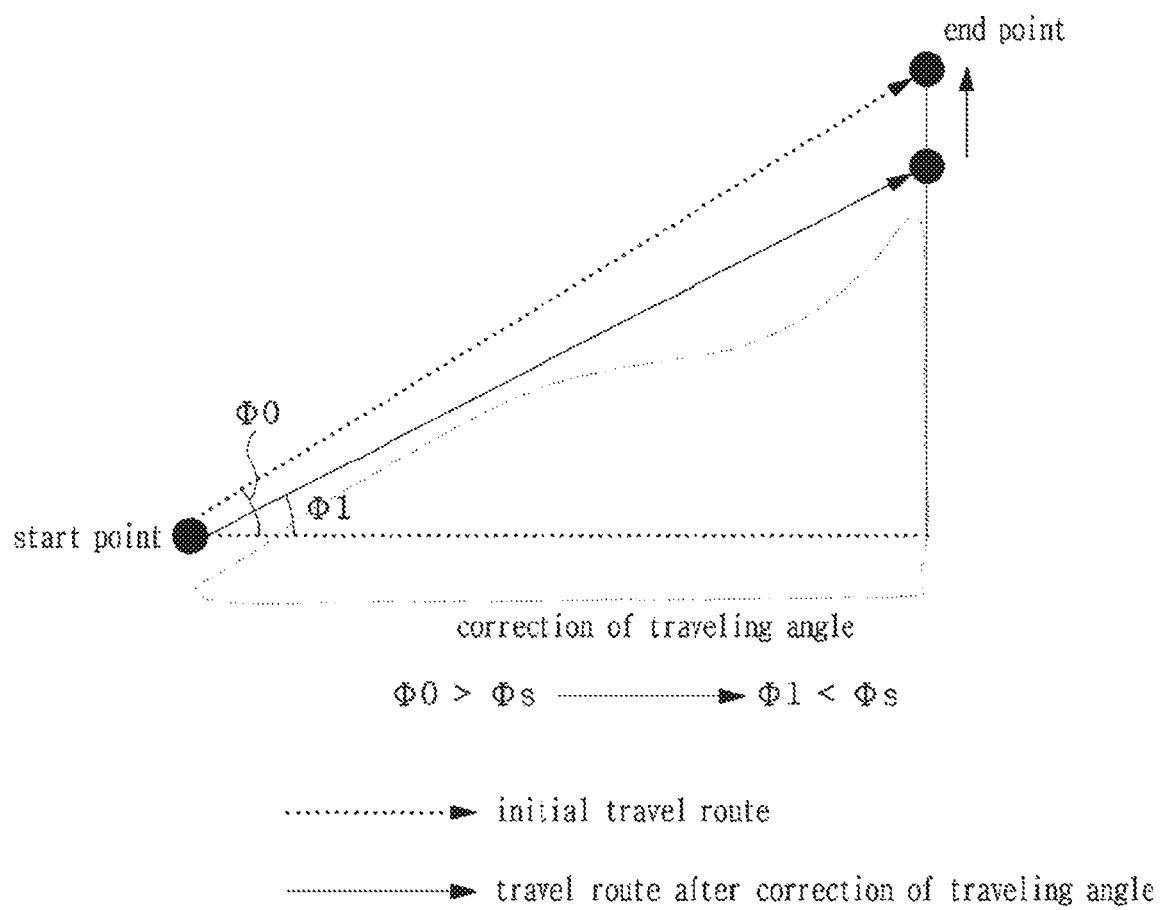
Figure 7C:
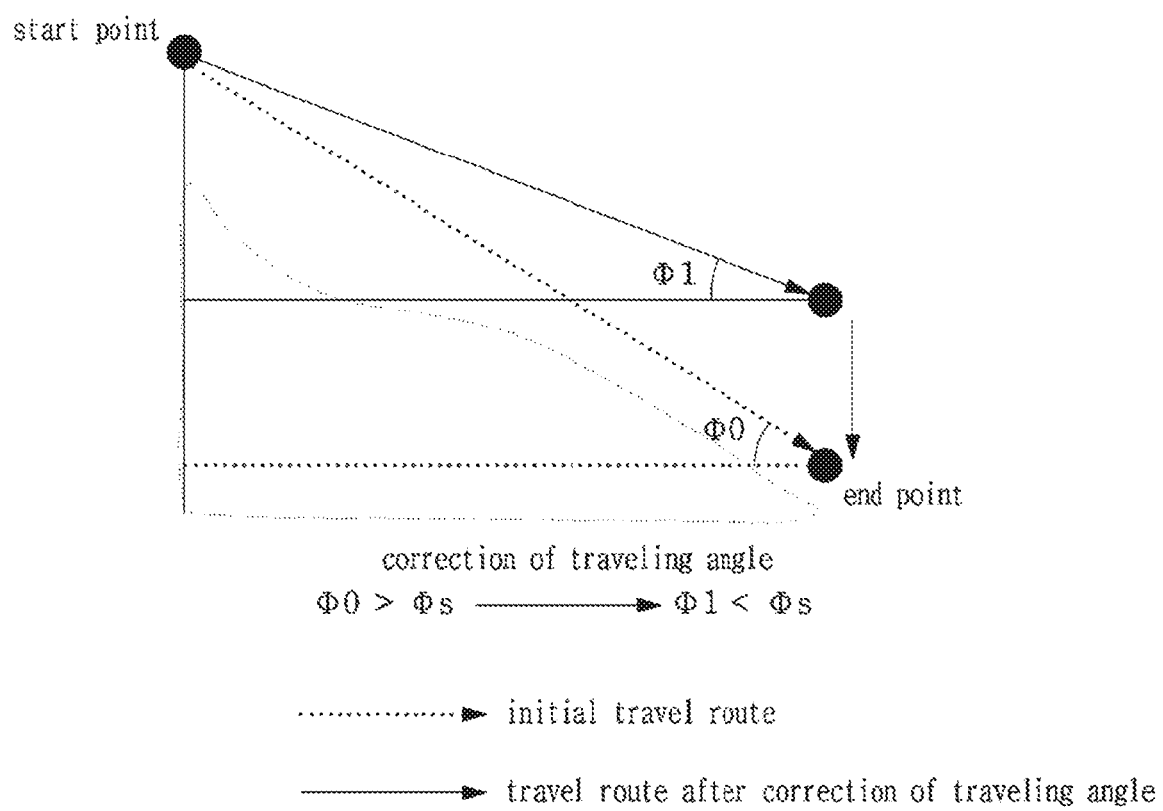
Figure 7D:
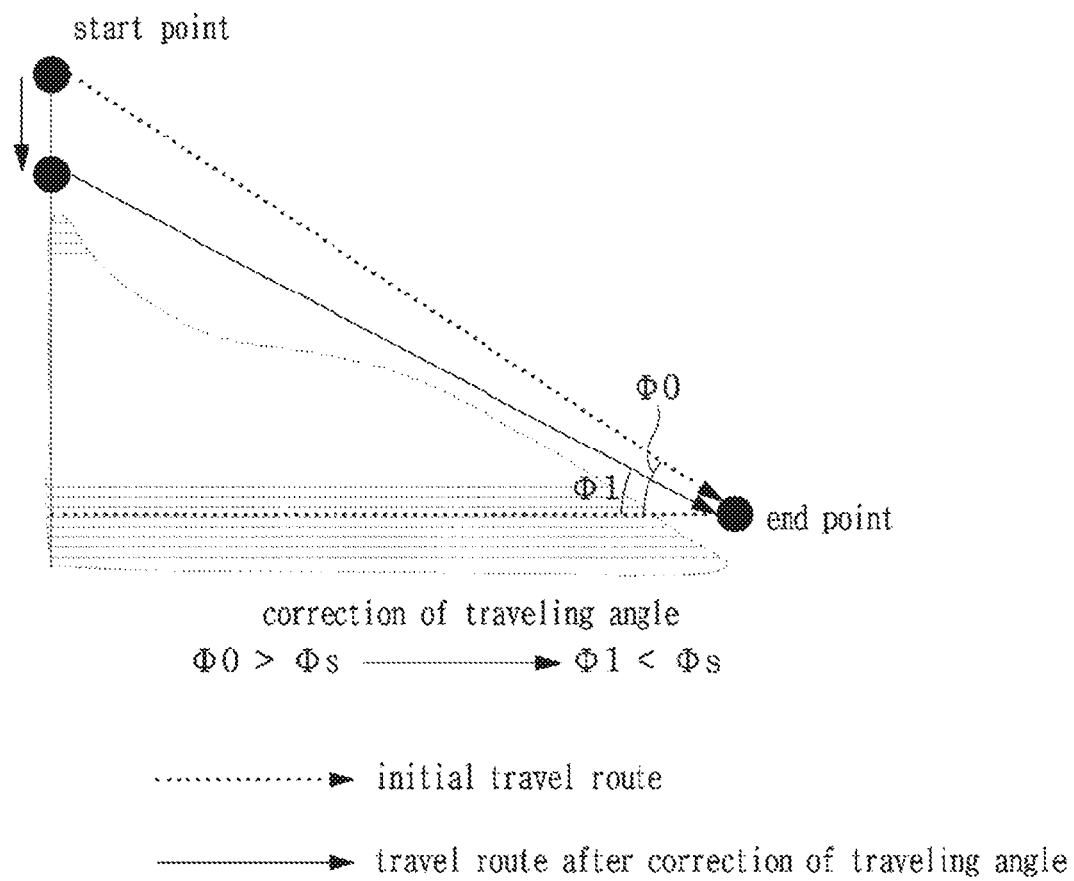

Further, the unmanned delivery management device 10 may set a traveling angle (elevation or depression angle) of a traveling direction or a travel slope for the upward movement traveling range or the downward movement traveling range (S255). For example, as illustrated in FIGS. 6A and 6B, when a plurality of sampling sections s1 to s2, s2 to s3, s3 to s4, s4 to s5, and s5 to s6 are consecutive sampling sections in which an upward movement is required, these consecutive sampling sections may be set as a single traveling range wp', specifically, an upward movement traveling range within which the unmanned delivery device moves upward.

The unmanaged delivery management device 10 may set a traveling angle of a travel direction of the unmanned delivery device for the upward movement traveling range through the above-described process.

The unmanned delivery management device 10 may set the altitude value of the start point (or the end point) of the traveling range as the operating altitude value for movement of the unmanned delivery device 50 in the case where the traveling range is the horizontal movement traveling range. The unmanaged delivery management device 10 may set the operating altitude value of the upward movement traveling range or the downward movement traveling range by reflecting the travel slope value of a current traveling range to the altitude value of the end point of the preceding traveling range.

Further, in Step S252, the unmanned delivery management device 10 may determine whether horizontal movement is possible by using the minimum value of the maximum operating altitude information as a reference value, and considering the terrain altitude value for each traveling range. The unmanned delivery management device 10 may change the settings of the upward or downward movement traveling ranges. Specifically, when the operating altitude value of a certain traveling range is less than the minimum value of the maximum operating altitude information, the corresponding traveling range is reset as a horizontal movement traveling range, and the altitude value of the start point or the end point of the reset traveling range is set as the operating altitude value of the corresponding traveling range.

When the upward or downward movement traveling range is reset as the horizontal movement traveling range, the unmanned delivery management device 10 may increase the number of the sampling sections within the horizontal movement traveling range in which horizontal movement is possible. In this way, it is possible to extend the traveling range in which horizontal movement is possible, thereby reducing the power consumption for the operation of the unmanned delivery device 50.

Further, the operating altitude value of the start point of the reset traveling range can be calculated by the following Equation 12.

$$A_{o(0)} = a_{(0)} + A_{min}$$ [Equation 12]

When the altitude values of $id_{(i)}$ and $id_{(i-1)}$ are not equal to each other within the traveling range in which the travel direction is set to be the same, the unmanned delivery management device 10 obtains a reference slope value $As_{(id)}$ of a cumulative terrain altitude difference value using position values $S_{(i)}$ of a start point or an end point of the same Id range and the number of the traveling ranges $E_{(id)}$ through the operation of Equation 13.

$$A_{s(id)} = \Sigma_{i=S_{(id)}}^{S_{(id)}+E_{(id)}-1} D_{(i)}/E_{(id)}$$

When $|D_{(i)}| < \alpha$, $A_{o(i)} = A_{o(i-1)} + (A_{s(id)} = 0)$

When $|D_{(i)}| \geq \alpha$, $A_{o(i)} = A_{o(i-1)} + A_{s(id)}$ [Equation 13]

When a traveling angle for each traveling range is set through the above operation, the unmanned delivery management device 10 may set a delivery route for every traveling range included in the full travel path (S206).

In order to verify whether the generated travel altitude value for each traveling range is appropriate, a difference value between the terrain altitude value and the generated travel altitude value is calculated for each sampling section. In this way, it is possible to verify whether the travel altitude value of each sampling section is within a safe operating altitude range.

When the altitude value on the delivery route is out of the safe operating altitude range, that is, when it is greater than the maximum operating altitude or less than the minimum operating altitude, the unmanned aerial vehicle operation management device (unmanned delivery management device) performs an operation of correcting the delivery route.

For example, the unmanned delivery management device 10 may reflect the initial altitude value in the altitude values of the waypoints within the traveling range. Then, the unmanned delivery management device 10 may check the safe traveling angle for each traveling range to which the initial altitude value is applied, and determine the waypoint where the traveling angle (for an upward movement or a downward movement) is to be corrected. Thereafter, the unmanned delivery management device 10 may generate a new travel condition for a traveling range having a different type from the previous traveling range. For example, the unmanned delivery management device 10 may generate a region of a curved travel route by reflecting the travel speed, the traveling angle change, the traveling distance, and the like. Then, the unmanned delivery management device 10 may generate and provide the altitude value for each waypoint and the traveling distance between the waypoints, the total traveling distance of the unmanned delivery device, and the traveling angle for each traveling range.

Use the same value for the traveling ranges identified as $(Id_{(i-1)} \neq Id_{(i)})$ Starting section $S_{(id)}$, ending section $E_{(id)}$ (when there is only a single section, $E_{(id)} = 1$)

The traveling distance value of a traveling range (tangential distance)

A subtotal of horizontal traveling distances (at 0 m above sea level):

$$A_{o\_l(id)} = \Sigma_{i=S_{(id)}}^{S_{(id)}+E_{(id)}-1} A_{S\_l(i)}$$

A subtotal of altitude differences:

$$A_{h\_l(id)} = \Sigma_{i=S_{(id)}}^{S_{(id)}+E_{(id)}-1} A_{h(i)}, A_{h(i)} = (A_{o(i-1)} + A_{(i)})$$

A distance of a tangential surface:

$$S_{sl(id)} = \sqrt{A_{o\_l(id)}^2 + A_{h\_l(id)}^2}$$

A traveling angle value for each traveling range:

$$\emptyset_{(id)} = \sin(A_{h\_l(id)}/S_{sl(id)})180/\pi$$ [Equation 14]

The unmanned delivery management device 10 may correct a traveling angle (elevation or depression angle) such that the unmanned delivery device can safely travel. For this purpose, the unmanned delivery management device 10 may set an ascending or descend point where the unmanned delivery device ascends or descends to correct a traveling angle of the unmanned delivery device such that the unmanned delivery device can travel with a safe traveling angle.

Referring to FIGS. 7A to 7D, the unmanned delivery management device 10 may correct operating altitude values for traveling ranges in which the unmanned delivery device travels with a traveling angle greater than a safe traveling angle φs by correcting upward and/or downward altitudes values and the slope value. For example, the unmanned delivery management device 10 may set an operating altitude value of a traveling range by raising the altitude of the start point or lowering the altitude of the end point for the upward movement traveling range, or by raising the altitude value of the end point or lowering the altitude value of the start point of the downward movement traveling range.

In an alternative way, the unmanned delivery management device 10 may check a region where the traveling angle of the unmanned delivery device exceeds the preset safe traveling angle by considering the terrain altitude values within the traveling ranges, and correct the operating altitude value of the corresponding region.

Figure 8:
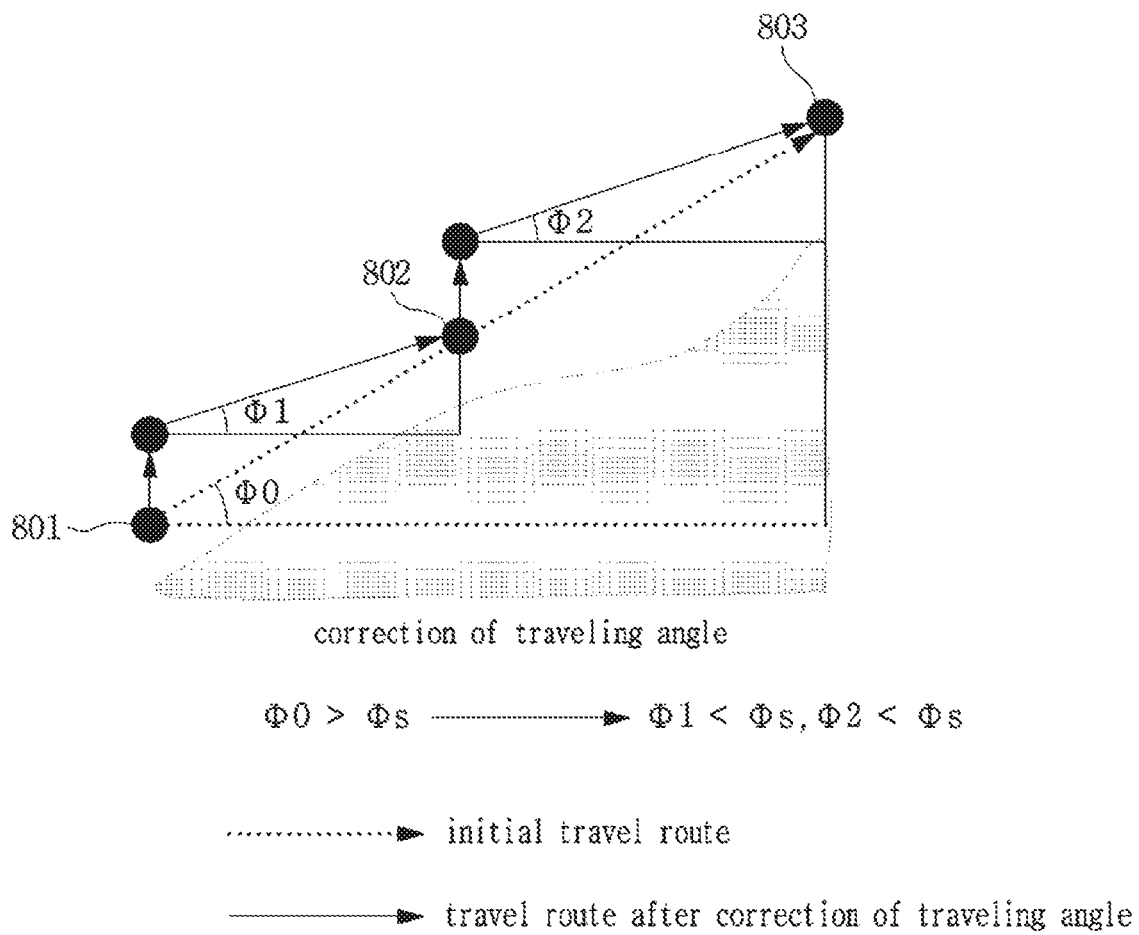
FIG. 8 is a diagram illustrating a traveling angle corrected by the unmanned delivery device operation method according to one embodiment of the present disclosure.

For example, referring to FIG. 8, the unmanned delivery management device 10 may check a traveling angle of a predetermined region (for example, a region corresponding to a length of a single sampling section) from a start point to a certain waypoint 802 of a traveling range, and may set the corresponding waypoint as a transit point 802 when the confirmed traveling angle exceeds the safe traveling angle φs. Then, the unmanned delivery management device 10 may correct the operating altitude value such that the traveling angle at the transit point 802 falls within the safe traveling angle. For example, the operating altitude value of the start point 801 may be increased such that the traveling angle between the start point 801 and the transit point 802 within the traveling range can fall within a safe traveling angle range. Alternatively, the operating altitude value of the transit point 802 may be increased such that the traveling angle from the transit point 802 to the end point 803 of the traveling range can fall within the safe traveling angle range.

Figure 9:
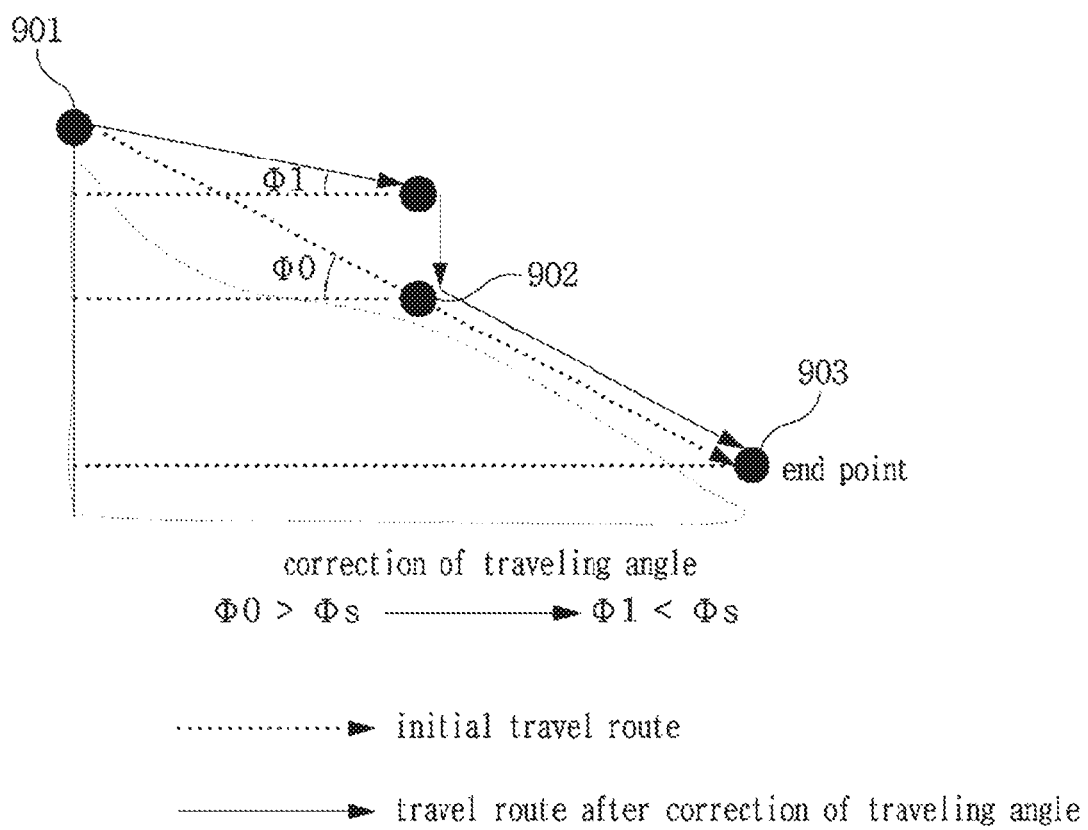
FIG. 9 is a diagram illustrating an example of correcting a traveling range using the unmanned delivery device operation method according to one embodiment of the present disclosure.
Figure 10:
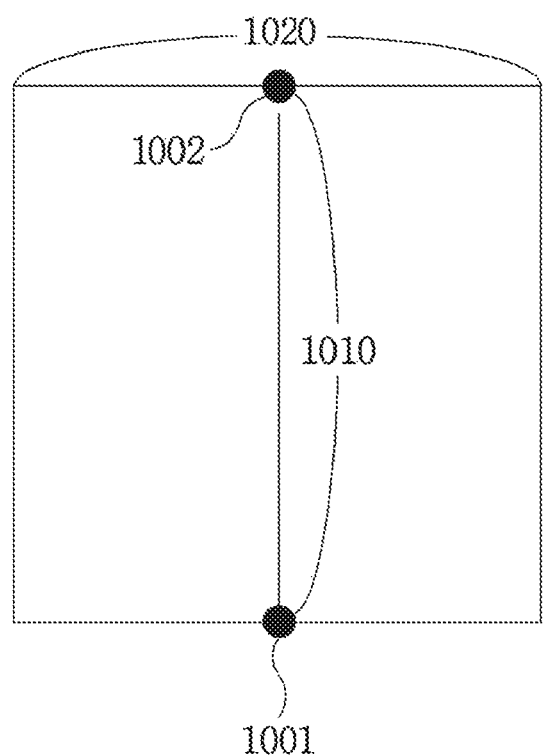
FIG. 10 is a view illustrating an auxiliary traveling zone set by using the unmanned delivery device operation method according to one embodiment of the present disclosure.

Further, referring to FIG. 9, the unmanned delivery management device 10 may check the traveling angle of a predetermined region (for example, a region corresponding to a length of a single sampling section) from the start point of the traveling range to a predetermined point in a downward movement traveling range, and may determine the predetermined point as a transit point 902 when the confirmed traveling angle exceeds the safe traveling angle φs. Therefore, the unmanned delivery management device 10 may correct the operating altitude value of the transit point 902 such that the traveling angle at the transit point 902 can fall within the safe traveling angle range. For example, the operating altitude value of the transit point 902 may be increased such that the traveling angle between the start point 901 of the traveling range and the transit point 902 can be set to a value within the safe traveling angle range. The operating altitude value of the transit point 902 may be lowered such that the traveling angle from the transit point 902 to the end point 903 of the traveling range can be set to a value within the safe traveling angle range. Specifically, the cumulative altitude difference of the traveling range is calculated by Equation 15, a reference altitude value for correction is calculated by Equation 16, and the slope value of the corrected section can be calculated by Equation 17. Then, the altitude values for the traveling range can be corrected through the operation of Equation 18.

Identification of a travel direction: the travel direction is a positive direction (+) when φs<φ0, and the travel direction is a negative direction (−) when −φs>φ0.

Generation of a difference value between the first generated traveling angle and the safe traveling angle:

$$\varnothing_d = ||\varnothing_s| - |\varnothing_o||$$

The altitude value for the safe traveling angle:

$$(A_{S_h}) = A_{o_{l(id)}} \tan(\text{rad}(\varnothing_s)), A_{o_{l(id)}} \Sigma_{i=S_{(id)}}^{S_{(id)}+E_{(id)}-1} A_{S_{l(i)}}$$
$$A_{s(id)} = \Sigma_{i=S_{(id)}}^{S_{(id)}+E_{(id)}-1} D_{(i)} E_{(id)}$$
[Equation 15]

$$A_{c_h} = ||A_{S_h}| - |A_{s(id)}||$$

When $A_{max} > (A_{c_h} + \{A_{o(i)} - A_{o(i-1)} | i = S_{(id)}\}), A_{c_h}$

Else, $A_{c_h} = A_{c_h} - A_{max}$ [Equation 16]

The slope value of the corrected section of the upward movement traveling range: [$A_{c_s}$(id)]=(altitude value of destination−altitude value of start point of corrected section+ corrected altitude value)/the number of traveling ranges $$A_{c_s}(\text{id}) = (A_{o(S_{(id)}+E_{(id)}-1)} - A_{o(S_{(id)})} + A_{c_h})/E_{(id)}$$

The slope value of the corrected section of the downward movement traveling range: [$A_{c_s}$(id)]=(altitude value of destination+corrected altitude value−altitude value of start point of corrected section)/the number of traveling ranges $$A_{c_s}(\text{id}) = (A_{o(S_{(id)}+E_{(id)}-1)} + A_{c_h} - A_{c_h}(\text{id}))/E_{(id)}$$ [Equation 17]

$$A_{co(i)} = A_{o(i)} + A_{c_s}(\text{id})$$ [Equation 18]

A traveling altitude value is generated in accordance with the upward or downward angle correction such that the unmanned delivery device can travel at the safety traveling angle, and the traveling distance and the traveling angle of the traveling range are generated by reflecting the corrected altitude value of the transit point. First, it may be determined whether the altitude value of the traveling range is a positive altitude or a negative altitude, which can be confirmed through the calculation of Equation 19.

When $\phi_s < \phi_0$, a positive altitude at the start point:
$A_{c_h}(\text{id})$ When $-\phi_s > \phi_0$, a negative altitude at the end point:
$-A_{c_h}(\text{id})$ [Equation 19]

Further, the unmanned delivery management device 10 may check the traveling angle and the traveling distance of the corrected traveling range. The traveling angle can be confirmed through the calculation of Equation 20 and the traveling distance can be confirmed through the calculation of Equation 21.

A subtotal of horizontal traveling distances (0 m above sea level):

$$A_{o\_l(id)} = \Sigma_{i=S_{(id)}}^{S_{(id)}+E_{(id)}-1} A_{S\_l(i)}$$

A subtotal of traveling altitude differences:

$$A_{Ch\_l(id)} = \Sigma_{i=S_{(id)}}^{S_{(id)}+E_{(id)}-1} A_{h(i)}, A_{h(i)} = (A_{Co(i-1)} + A_{(i)})$$

A distance of a tangential surface:

$$S_{Csl(id)} = \sqrt{A_{o\_l(id)}^2 + A_{Ch\_l(id)}^2}$$ [Equation 20]

A traveling angle value of the corrected traveling range:

$$\varnothing_{C(id)} = \sin(A_{Ch\_l(id)}/S_{Csl(id)})180/\pi$$ [Equation 21]

In the above-described embodiment, the operation of the unmanned delivery management device 10 is described on the assumption that a travel path from a start point 1001 to an end point 1002 of a traveling range is a linear path 1010. Alternatively, the unmanned delivery management device 10 may set a traveling range having a predetermined area (for example, a range including left-hand and right-hand areas) 1020 around the linear path 1010. For example, the unmanned delivery management device 10 may determine latitude and longitude values for a predetermined size area 1020 having a predetermined size (for example, 10 meters) and a terrain altitude value for the predetermined size area 1020 (for example, 10 meters). Then, the unmanned delivery management device 10 may set the traveling range by reflecting the terrain altitude value for the predetermined size area 1020 (for example, 10 m).

Figure 11A:
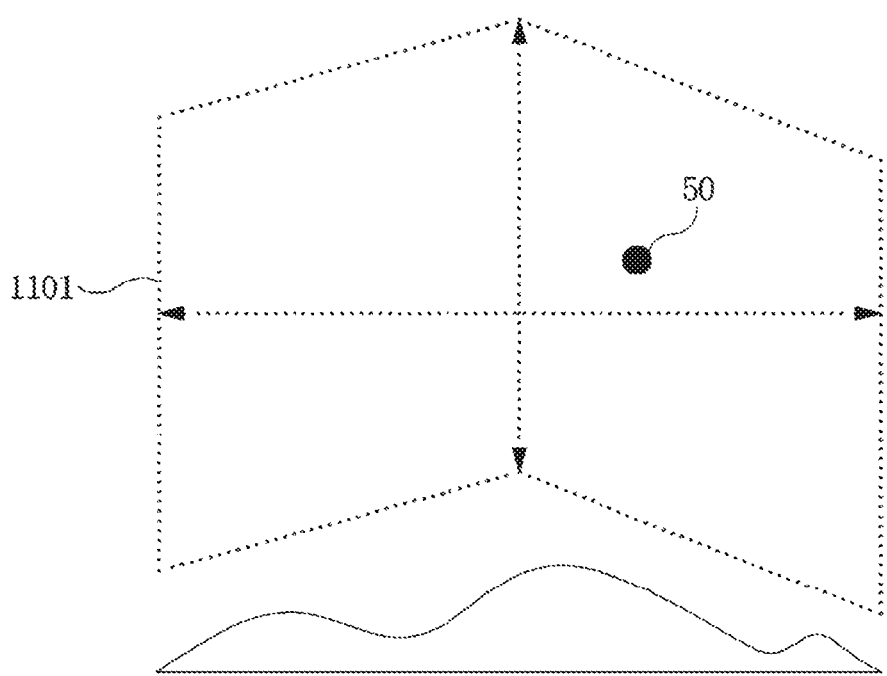
FIG. 11A is a view illustrating an unmanned delivery device traveling within an auxiliary traveling zone set by using the unmanned delivery device operation method according to one embodiment of the present disclosure.
Figure 11B:
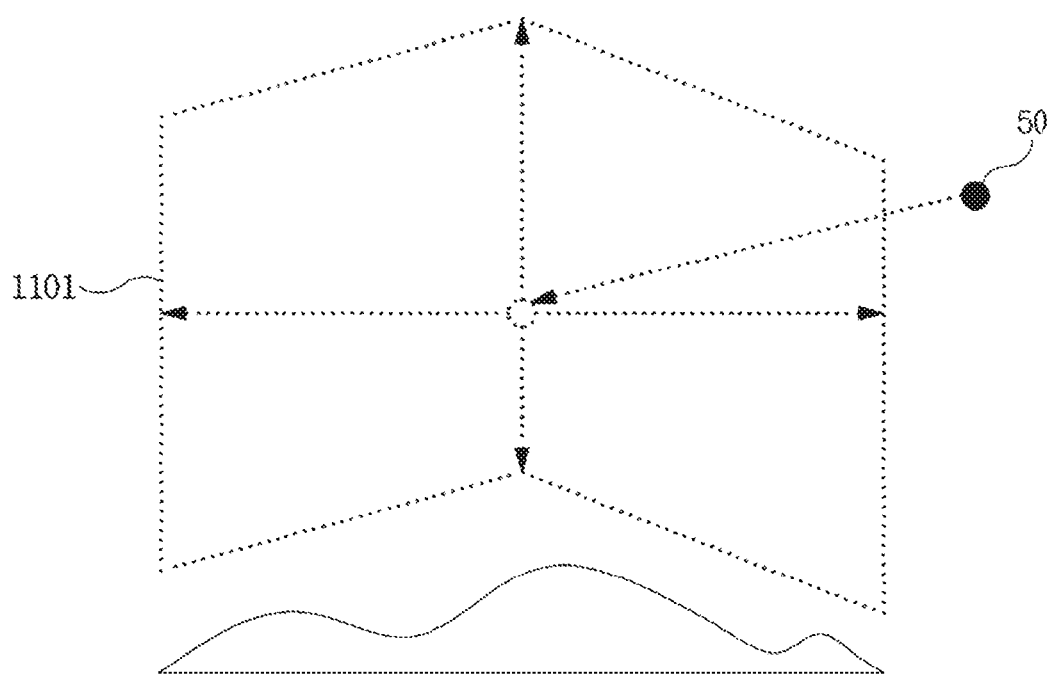
FIG. 11B is a diagram illustrating the unmanned delivery device traveling outside the auxiliary traveling zone set by the unmanned delivery device operation method according to one embodiment of the present disclosure.

For example, when the altitude value of the traveling range, which is preset in consideration of the linear path 1010, and the terrain altitude value for the predetermined size range 1020 (for example, 10 m) are within a predetermined threshold range, the unmanned delivery management device 10 may change the transit points within the predetermined size range 1020. In addition, the predetermined size range 1020 may be set as an auxiliary traveling zone, and the operation of the unmanned delivery device 50 may be controlled in consideration of the auxiliary traveling zone. For example, referring to FIG. 11, when the unmanned delivery management device 10 may check the location of the unmanned delivery device 50 and confirm that the unmanned delivery device 50 travels within the auxiliary traveling zone 1101 (see FIG. 11A), the unmanned delivery management device 10 determines that the unmanned delivery device 50 normally travels. However, when the location of the unmanned delivery device 50 is determined to be out of the auxiliary traveling zone 1101 (see FIG. 11B), the unmanned delivery management device 10 may determine that the unmanned delivery device 50 has deviated from the planned route.

When the unmanned delivery device 50 is outside the auxiliary traveling zone 1101, the unmanned delivery management device 10 may transmit a command or signal for controlling the movement of the unmanned delivery device 50 so that the unmanned delivery device 50 can move to enter the auxiliary traveling zone 1101, to the unmanned delivery device 50.

Alternatively, the unmanned delivery device 50 may check the information on the auxiliary traveling zone 1101 when setting the delivery route, obtain the values provided by on-board sensors that measure the location, altitude, and temperature, etc., determine whether the unmanned delivery device 50 travels outside the auxiliary traveling zone based on the obtained values, and may control the movement of the unmanned delivery device 50 so that the unmanned delivery device 50 can travel within a predetermined traveling range of the route when the unmanned delivery device 50 is determined as traveling outside the auxiliary traveling zone.

The route information that is set through the above-described operation may be transmitted to the unmanned delivery device 50 and used to control the movement of the unmanned delivery device 50. For example, the unmanned delivery device 50 may check the traveling range or the waypoint included in the route information, and move autonomously in accordance with the confirmed location and altitude information.

Further, the unmanned delivery device 50 may check its own location information and altitude information, and check whether the confirmed location information and altitude information are out of the traveling range or the waypoint included in the route information. The flight status checking unit 55 may perform an operation of requesting its remote control by the unmanned delivery management device 10 or the delivery management terminal device 30 when the confirmed location information and the altitude information are out of the travel interval or the waypoint included in the route information.

Further, the route information may include the above-described auxiliary traveling zone, and the unmanned delivery device 50 may operate while setting the auxiliary traveling zone as a reference zone (criterion) to determine whether to perform the remote control.

Although the exemplary methods of the present disclosure are represented by a series of operations for clarity of explanation, they are not intended to limit the order in which the steps are performed, and if necessary, each step may be performed simultaneously or in a different order. In order to implement the method according to the present disclosure, the illustrative steps may additionally include other steps, include the remaining steps except for some steps, or may include additional steps other than some steps.

The various embodiments of the present disclosure are not intended to be limited to all possible combinations, but rather to illustrate representative aspects of the present disclosure. Those described in various embodiments may be applied independently or in a combination of two or more.

Furthermore, various embodiments of the present disclosure may be implemented by hardware, firmware, software, or a combination thereof. In the case of hardware implementation, the present disclosure may be implemented by one or more application specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, and the like.

The scope of the present disclosure includes software and machine-executable instructions (for example, operating systems, applications, firmware, programs, etc.) that cause operations of the methods of the various embodiments to be performed on a device or computer, and also include a non-transitory computer-readable medium in which such software or instructions are stored to be executable on a device or computer.

The invention claimed is:

1. A system for operating an unmanned delivery device, the system comprising:
   an unmanned delivery device for delivering at least one delivery item to a destination according to route information;
   an unmanned delivery management device for setting at least one sampling section with respect to a travel route to the destination of the at least one delivery item, checking a type of the sampling section based on location information and altitude information of the sampling section, setting a traveling range including the at least one sampling section based on the type of the sampling section, generating the route information including the at least one traveling range, providing delivery list information and the route information to the unmanned delivery device, and checking flight status information of the unmanned delivery device; and
   a delivery management terminal device for outputting the delivery list information, the route information, the flight status information of the unmanned delivery device.

2. An apparatus for operating an unmanned delivery device, the apparatus comprising:
   at least one processor, the processor being configured to:
   set at least one sampling section with respect to a travel route to the destination of an at least one delivery item,
   check a type of the sampling section based on location information and altitude information of the sampling section,
   set a traveling range including the at least one sampling section based on the type of the sampling section,
   generate the route information including the at least one traveling range, providing delivery list information and the route information to the unmanned delivery device, and
   check flight status information of the unmanned delivery device.

3. The apparatus according to claim 2, wherein the types of the sampling sections include a horizontally movable sampling section within an upward movement traveling range, a horizontally movable sampling section within a downward movement traveling range, an upwardly movable sampling section, and a downwardly movable sampling section.

4. The apparatus according to claim 2, wherein the the processor being configured to:
check a travel direction corresponding to the type of each sampling section, and
set a plurality of consecutive sampling sections having the same travel direction as one traveling range of the traveling ranges.

5. The apparatus according to claim 2, wherein the processor being configured to:
set a traveling distance and a traveling angle of the traveling range.

6. The apparatus according to claim 5, wherein the processor being configured to:
set an altitude value of a start point of the traveling range or an altitude value of an end point of the traveling range, based on the traveling angle of the traveling range.

7. The apparatus according to claim 5, wherein the processor being configured to:
set a transit point within the traveling range in consideration of the traveling angle,
check a first traveling angle for a zone from the start point of the traveling range to the transit point and a second traveling angle for a zone from the transit point to the end point of the traveling range, and
correct at least one of the altitude value of the start point of the traveling range, the altitude value of the end point of the traveling range, and the altitude value of the transit point, in consideration of the first traveling angle and the second traveling angle.

8. The apparatus according to claim 2, wherein the processor being configured to:
set an auxiliary traveling zone extended from the traveling range by a predetermined dimension in a vertical direction, a horizontal direction, or both, and
set a waypoint to be present within the auxiliary traveling zone.

9. The apparatus according to claim 2, wherein the processor being configured to:
check the traveling range and an auxiliary traveling zone that is set with respect to the traveling range,
configure a remote controllable environment in which the unmanned delivery device is remote-controlled by the unmanned delivery management device or the delivery management terminal device when it is determined that a location of the unmanned delivery device is out of the traveling range or the auxiliary traveling zone, and
perform a movement process by receiving a remote control signal from the unmanned delivery management device or the delivery management terminal device.

10. The apparatus according to claim 2, wherein the processor being configured to:
generate path information for guiding unmanned delivery device to a safe landing point in consideration of a remaining amount of a battery, and
provide the path information to the unmanned delivery device.

11. A method for operating an unmanned delivery device, the method comprising:
setting at least one sampling section with respect to a travel route to a destination of at least one delivery item;
checking a type of the sampling section based on location information and altitude information of the sampling section;
setting a traveling range including the at least one sampling section based on the type of the sampling section;
generating route information including the at least one traveling range; and
providing the route information to the unmanned delivery device.

12. The method according to claim 11, wherein the types of the sampling sections includes a horizontally movable sampling section within an upward movement traveling range, a horizontally movable sampling section within a downward movement traveling rage, an upwardly movable sampling section, and a downwardly movable sampling section.

13. The method according to claim 11, wherein the checking of the type of the sampling section comprises:
determining the type of the sampling section in consideration of a maximum value of terrain altitudes of an area on the way to the destination and a minimum value of operating altitude information.

14. The method according to claim 11, wherein the setting of the traveling range comprises:
checking a travel direction corresponding to the type of the sampling section; and
setting a plurality of consecutive sampling sections having the same travel direction as one traveling range of the traveling ranges.

15. The method according to claim 11, wherein the generating of the route information comprises:
setting a traveling distance of the traveling range and an traveling angle within the traveling range.

16. The method according to claim 15, wherein the generating of the route information comprises:
setting an altitude value of a start point of the traveling range or an altitude value of an end point of the traveling range in consideration of the traveling angle.

17. The method according to claim 16, wherein the generating of the route information comprises:
setting the altitude value of the start point of the traveling range or the altitude value of the end point of the traveling range in consideration of a safety traveling angle.

18. The method according to claim 15, wherein the generating of the route information comprises:
setting a transit point within the traveling range in consideration of the traveling angle in the traveling range;
checking a first traveling angle for a zone from the start point of the traveling range to the transit point and a second traveling angle for a zone from the transit point to the end point of the traveling range; and
correcting at least one of an altitude value of the start point of the traveling range, an altitude value of the end point of the traveling range, and an altitude value of the transit point in consideration of the first traveling angle and the second traveling angle.

19. The method according to claim 11, wherein the generating of the route information comprises:
setting an auxiliary traveling zone extended from the traveling range by a predetermined size in a vertical direction, a horizontal direction, or both; and
setting a waypoint to be within the auxiliary traveling zone.

20. The method according to claim 11, wherein the generating of the route information comprises:

setting an auxiliary traveling zone extended from the traveling range by a predetermined size in a vertical direction, a horizontal direction, or both, wherein the auxiliary traveling zone is used as a reference to determine whether it is necessary to perform remote control of the unmanned delivery device.

\* \* \* \* \*